(12) United States Patent
Lin et al.

(10) Patent No.: US 12,456,513 B2
(45) Date of Patent: Oct. 28, 2025

(54) RESERVOIR DEVICE AND RESERVOIR ARRAY

(71) Applicant: MACRONIX INTERNATIONAL CO., LTD., Hsinchu (TW)

(72) Inventors: Yu-Hsuan Lin, Taichung (TW); Feng-Min Lee, Hsinchu (TW); Ming-Hsiu Lee, Hsinchu (TW); Yu-Yu Lin, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 173 days.

(21) Appl. No.: 18/476,411

(22) Filed: Sep. 28, 2023

(65) Prior Publication Data

US 2025/0111874 A1   Apr. 3, 2025

(51) Int. Cl.
*G11C 11/40* (2006.01)
*G11C 11/4074* (2006.01)
*G11C 11/408* (2006.01)
*G11C 11/4091* (2006.01)
*G11C 11/4096* (2006.01)

(52) U.S. Cl.
CPC ...... *G11C 11/4096* (2013.01); *G11C 11/4074* (2013.01); *G11C 11/4087* (2013.01); *G11C 11/4091* (2013.01)

(58) Field of Classification Search
CPC ............ G11C 11/4096; G11C 11/4074; G11C 11/4087; G11C 11/4091
See application file for complete search history.

(56) References Cited

U.S. PATENT DOCUMENTS

| 5,940,316 A | 8/1999 | Koike |
| 6,314,017 B1 | 11/2001 | Emori |
| 11,056,178 B1 | 7/2021 | Bedeschi |
| 2007/0002611 A1* | 1/2007 | Ye .......................... G11C 7/062 365/177 |

(Continued)

FOREIGN PATENT DOCUMENTS

| CN | 101004952 A | 7/2007 |
| WO | 2017209858 A1 | 12/2017 |

OTHER PUBLICATIONS

Tang, et al.: "ECRAM as Scalable Synaptic Cell for High-Speed, Low-Power Neuromorphic Computing"; 978-1-7281-1987-8/18/$31.00 © 2018 IEEE; pp. 13.1.1-13.1.4.

(Continued)

*Primary Examiner* — Xiaochun L Chen
(74) *Attorney, Agent, or Firm* — McClure, Qualey & Rodack, LLP

(57) ABSTRACT

A reservoir device, comprises a first transistor and a second transistor. A gate of the first transistor is coupled to a write word line, a drain of the first transistor is coupled to a write bit line. A source of the second transistor is coupled to a read source line, a drain of the second transistor is coupled to a read bit line, and a gate of the second transistor is coupled to a source of the first transistor. A storage node is located on a coupling point between the gate of the second transistor and the source of the first transistor. The reservoir device selectively performs a write operation, a read operation or a refresh operation in response to an input voltage received by the write word line, the write bit line, the read source line and the read bit line respectively.

19 Claims, 24 Drawing Sheets

(56) References Cited

U.S. PATENT DOCUMENTS

2020/0342932 A1* 10/2020 Bennett .............. G11C 11/4096

OTHER PUBLICATIONS

Nebashi, et al.: "High-Density and Fault-Tolerant Cu Atom Switch Technology Toward 28nm-node Nonvolatile Programmable Logic"; 978-1-5386-4218-4/18/$31.00 © 2018 IEEE; pp. 127-128.
Duan, et al.: "Novel Vertical Channel-All-Around(CAA) IGZO FETs for 2T0C DRAM with High Density beyond 4F2 by Monolithic Stacking"; 978-1-6654-2572-8/21/$31.00 © 2021 IEEE; pp. 10.5.1-10.5.4.
Moon, et al.: "Temporal data classification and forecasting using a memristor-based reservoir computing system"; Nature Electronics | vol. 480 2 | Oct. 2019 | 480-487 | www.nature.com/natureelectronics.

* cited by examiner

RESERVOIR DEVICE AND RESERVOIR ARRAY

TECHNICAL FIELD

The present disclosure relates to a semiconductor device, and more particularly, relates to a reservoir device based on transistors and capacitors.

BACKGROUND

Reservoir computing (RC) is based on a neural network framework and is suitable for processing temporal/sequential information. Reservoir devices are used to perform reservoir computing. Reservoir devices are untrained large, sparse and randomly connected nonlinear layers that may nonlinearly transform sequential inputs into a high-dimensional space. The current state of a reservoir device of a virtual node in the neural network is determined by the previous state of the reservoir device. And, according to the short-term memory characteristic of the reservoir device, the reservoir device may be quickly relaxed back to the original state.

In order to make the reservoir device suitable for performing in-memory computing (IMC), a reservoir device with an improved architecture is needed, which is easily integrated into memory devices.

SUMMARY

According to an aspect of the present disclosure, a reservoir device is provided, which comprises a first transistor and a second transistor. A gate of the first transistor is coupled to a write word line, a drain of the first transistor is coupled to a write bit line. A source of the second transistor is coupled to a read source line, a drain of the second transistor is coupled to a read bit line, and a gate of the second transistor is coupled to a source of the first transistor. A storage node is located on a coupling point between the gate of the second transistor and the source of the first transistor. The reservoir device selectively performs a write operation, a read operation or a refresh operation in response to an input voltage received by the write word line, the write bit line, the read source line and the read bit line respectively. when the reservoir device performs the write operation or the refresh operation, a voltage of the storage node changes, and when the reservoir device performs the read operation, the second transistor generates a read current, and the read current is related to the voltage of the storage node.

According to another aspect of the present disclosure, a reservoir array is provided. The reservoir array has a plurality of horizontal rows and a plurality of vertical columns, the reservoir array comprises a plurality of reservoir elements. The reservoir elements are respectively disposed in the horizontal rows and the vertical columns, and the horizontal rows comprise at least a first horizontal row and a second horizontal row, the vertical columns comprise at least a first vertical column and a second vertical column. The first transistors of the reservoir elements disposed in the first horizontal row are jointly coupled to a first write word line, and the second transistors of the reservoir elements are jointly coupled to a first read source line. The first transistors of the reservoir elements disposed in the second horizontal row are jointly coupled to a second write word line, and the second transistors of the reservoir elements are jointly coupled to a second read source line. The first transistors of the reservoir elements disposed in the first vertical column are jointly coupled to a first write bit line, and the second transistors of the reservoir elements are jointly coupled to a first read bit line. The first transistors of the reservoir elements disposed in the second vertical column are jointly coupled to a second write bit line, and the second transistors of the reservoir elements are jointly coupled to a second read bit line. In response to an input voltage received by the first write word line, the first write bit line, the first read source line, the first read bit line, the second write word line, the second write bit line, the second read source line and the second read bit line respectively, the reservoir elements selectively perform a write operation, a read operation or a refresh operation.

Figure 1:
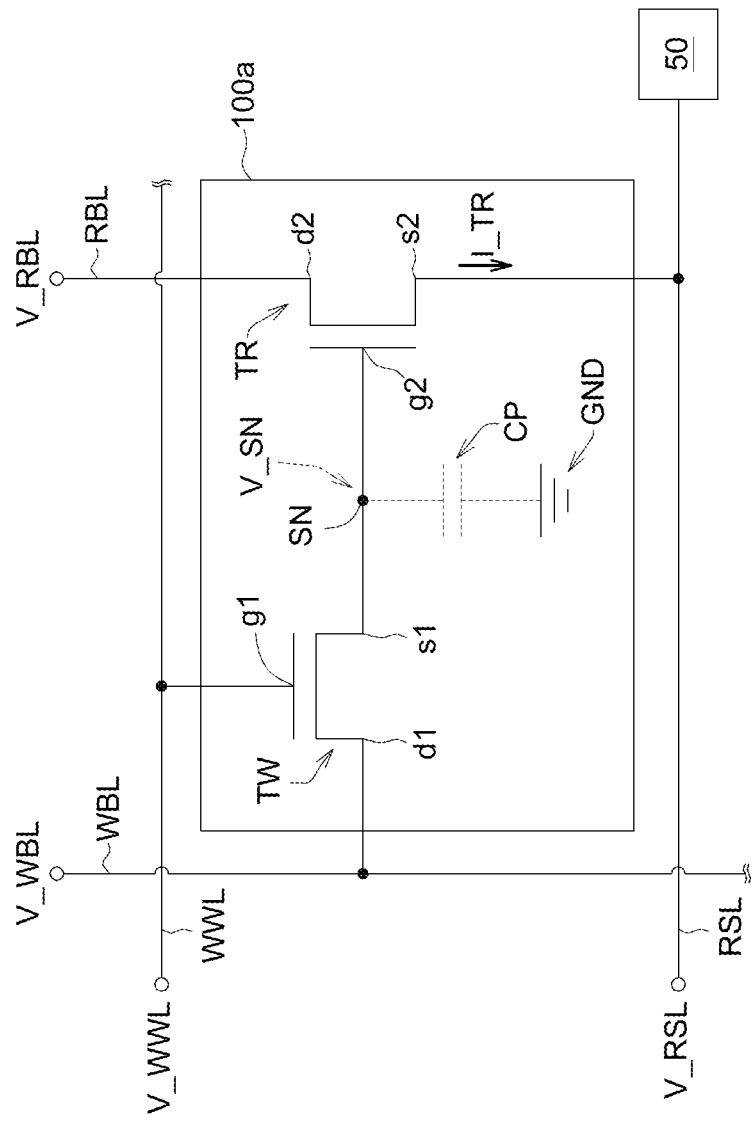
FIG. 1 is a circuit diagram of a reservoir device 100a according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1 is a circuit diagram of a reservoir device 100a according to an embodiment of the present disclosure. As shown in FIG. 1, the reservoir device 100a includes a transistor TW and a transistor TR. Each of the transistor TW and transistor TR is a three terminal selector, such as metal oxide semiconductor transistor (MOS), floating gate flash memory (FG flash), silicon nitride flash memory (SONOS flash), ferroelectric field effect transistor (FeFET) or indium gallium zinc oxide (IGZO) transistor. In this embodiment, both the transistor TW and the transistor TR are N-type metal oxide semiconductor transistors (NMOS). The transistor TW includes a gate g1, a drain d1 and a source s1. The transistor TR includes a gate g2, a drain d2 and a source s2. The source s1 of the transistor TW is coupled to the gate g2 of the transistor TR. The gate g1 of the transistor TW is coupled to the write word line WWL, and the drain d1 is coupled to the write bit line WBL. The source s2 of the transistor TR is coupled to the read source line RSL, and the drain d2 is coupled to the read bit line RBL. The write word line WWL is substantially parallel to the read source line RSL, and the write bit line WBL is substantially parallel to the read bit line RBL.

The coupling point between the source s1 of the transistor TW and the gate g2 of the transistor TR is a storage node SN. There is a parasitic capacitance CP between the storage node SN and the ground node GND, and the storage node SN has a voltage V_SN. The voltage V_SN of the storage node SN represents a state of the reservoir device 100a. The reservoir device 100a has short term memory characteristics, the current state of the reservoir device 100a is related to the previous state, and the reservoir device 100a may relax back to the original state. According to the short-term memory characteristics, the reservoir device 100a may be used to perform reservoir computing (RC), which is suitable for temporal/sequential information processing. In the embodiment shown in FIG. 1, the storage node SN is not coupled to any physical capacitor, and the reservoir device 100 a maintains the voltage V_SN of the storage node SN by the parasitic capacitance CP. Therefore, the reservoir device 100a in FIG. 1 is referred to as a "2T0C" architecture.

Table 1 shows three operations of the reservoir device 100a and the corresponding input voltages and input logic values. The three operations of the reservoir device 100a include a write operation, a refresh operation and a read operation.

TABLE 1

|  | V_WWL | V_WBL | V_RSL | V_RBL |
|---|---|---|---|---|
| Write operation | Vw/0 | Vb | 0 | 0 |
| Read operation | 0 | 0 | 0 | Vr |
| Refresh operation | Vw | 0 | 0 | 0 |

Please refer to both FIG. 1 and Table 1. The reservoir device 100a receives an input voltage V_WBL through the write bit line WBL, and receives an input voltage V_WWL through the write word line WWL. When the input voltage V_WWL is equal to the voltage value Vw, indicating that the reservoir device 100a receives a logic value "1" through the write word line WWL. The voltage Vw is greater than the threshold voltage Vt of the transistor TW. When the input voltage V_WWL is equal to the voltage Vw, the transistor TW is turned ON. When the input voltage V_WWL is equal to 0V, indicating that the reservoir device 100a receives a logic value "0" through the write word line WWL, and the transistor TW is turned OFF.

On the other hand, the reservoir device 100a receives the input voltage V_RBL through the read bit line RBL, and receives the input voltage V_RSL through the read source line RSL. When the input voltage V_RBL is equal to the voltage value Vr and the input voltage V_RSL is equal to 0V, it means that the reservoir device 100a receives a logic value "1" through the read bit line RBL and a logic value "0" through the read source line RSL, and the transistor TR is turned ON and generates a read current I_TR. The read current I_TR flows from the drain d2 to the source s2, and flows through the read source line RSL and is provided to the sensing circuit 50. When both the input voltage V_RBL and the input voltage V_RSL are equal to 0V, it means that the reservoir device 100a receives a logic value "0" through the read bit line RBL and the read source line RSL, and the transistor TR is turned OFF without generating the read current I_TR.

When the reservoir device 100a performs a write operation or a refresh operation, the voltage V_SN of the storage node SN changes in response to the input voltages V_WWL and V_WBL, the voltage V_SN changes at a first potential and a second potential. More particularly, when the reservoir device 100a performs a write operation, both the input voltage V_RSL and the input voltage V_RBL are equal to 0V, and the transistor TR is turned OFF. Moreover, when the input voltage V_WWL is equal to the voltage value Vw or 0V, and the input voltage V_WBL is equal to the voltage value Vb, the storage node SN may be written with a logic value "1". In this embodiment, when the input voltage V_WWL is equal to the voltage value Vw, and the input voltage V_WBL is equal to the voltage value Vb, the transistor TW is turned ON and a current flows from the drain d1 to the source s1, and the parasitic capacitor CP is charged, so that the voltage V_SN of the storage node SN rises to the first potential (i.e., the first potential is a high potential), indicating that the storage node SN is written with a logic value "1". On the other hand, when the input voltage V_WWL is equal to 0V and the input voltage V_WBL is equal to the voltage value Vb, the transistor TW is turned OFF, and the parasitic capacitor CP may not be charged.

When the reservoir device 100a performs a refresh operation, both the input voltage V_RSL and the input voltage V_RBL are 0V, and the transistor TR is turned OFF. Moreover, the input voltage V_WWL is equal to the voltage value Vw, and the input voltage V_WBL is equal to 0V, the transistor TW is turned ON and a current flows from the source s1 to the drain d1, and the parasitic capacitor CP is discharged, so that the voltage V_SN of the storage node SN relaxes back to the second potential. (i.e., the second potential is a low potential, the second potential is lower than the first potential, and the second potential is, for example, 0V), indicating that the storage node SN is refreshed as a logic value "0".

On the other hand, when the reservoir device 100a performs a read operation, the input voltage V_WWL and the input voltage V_WBL are both equal to 0V, and the transistor TW is turned OFF. Moreover, the input voltage V_RSL is 0V, and the input voltage V_RBL is equal to the voltage value Vr, and the transistor TR is turned ON. The voltage V_SN of the storage node SN is reflected in the read current I_TR of the transistor TR, and the read current I_TR is provided to the sensing circuit 50 through the read source line RSL.

In the above-mentioned embodiment, when the input voltages V_WWL, V_WBL, V_RSL and V_RBL are equal to 0V, it represents a logic value "0". In another example, the logic value "0" may also be represented as: the input voltages V_WWL, V_WBL, V_RSL and V_RBL are equal to the low voltage value. This low voltage value is less than the voltage values Vw, Vb and Vr and not equal to 0V.

Figure 2:
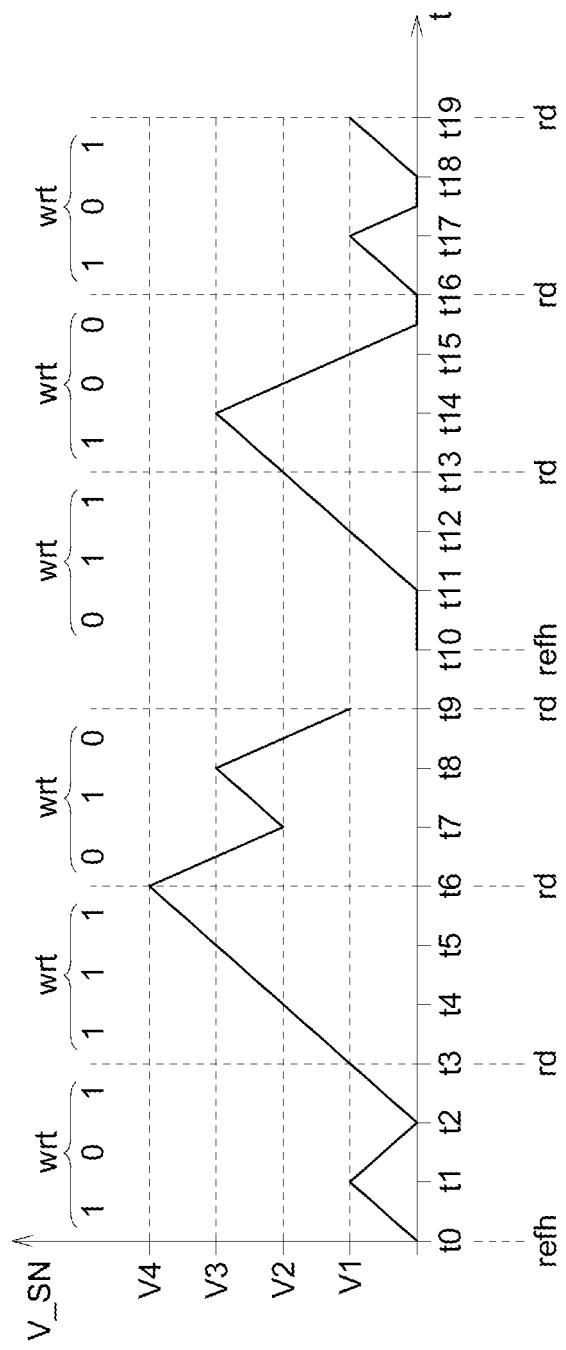
FIG. 2 is a diagram of timing relationship of the write operation wrt, refresh operation refh, and read operation rd of the reservoir device 100a of FIG. 1.

Next, please refer to FIG. 2, which is a diagram of timing relationship of the write operation wrt, refresh operation refh, and read operation rd of the reservoir device 100a of FIG. 1. The reservoir device 100a performs a refresh operation refh at time point to, and the voltage V_SN of the storage node SN is refreshed as 0V. Then, the reservoir device 100a performs three times of writing operations wrt between the time point to and the time point t3, and the gate g1 of the transistor TW receives the input voltage V_WWL. In the three times of write operations wrt, the input voltage V_WWL is the voltage value Vw, 0V and voltage value Vw respectively, indicating that the gate g1 of the transistor TW receives logic value "1", logic value "0" and logic value "1". In response to the received logical value "1", logical value "0" and logical value "1", the voltage V_SN of the storage node SN rises to the voltage value V1 at the time point t1, relaxes back to 0V at the time point t2, and rises again to the voltage value V1 at the time point t3.

After three times of write operations wrt, the reservoir device 100a performs a read operation rd at time point t3. The voltage V_SN of the storage node SN is equal to the voltage value V1 at the time point t3, and the voltage V_SN is reflected in the read current I_TR of the transistor TR. The read current I_TR is provided to the sensing circuit 50 through the read source line RSL.

Then, the reservoir device 100a performs another three times of write operations wrt between the time point t3 and the time point t6, and the input voltage V_WWL received by the gate g1 of the transistor TW is the voltage value Vw, indicating that gate g1 of transistor TW receives logic value "1" in all the three write operations wrt between the time point t3 and the time point t6. In response to the received logic value "1", the voltage V_SN of the storage node SN continues to rise between the time point t3 and the time point t6, and rises to the voltage value V4 at the time point t6. After the three write operations wrt between the time point t3 and the time point t6, the reservoir device 100a performs the read operation rd again at the time point t6. The voltage V_SN of the storage node SN is equal to the voltage value V4 at the time point t6 and is reflected in the read current I_TR of the transistor TR.

Then, the reservoir device 100a performs three writing operations wrt between the time point t6 and the time point t9, and the input voltage V_WWL received by the gate g1 of the transistor TW is 0V, voltage values Vw and 0V respectively, indicating that the gate g1 of the transistor TW respectively receives the logic value "0", the logic value "1" and the logic value "O". In response to the received logic value "0", logic value "1" and logic value "0", the voltage V_SN of the storage node SN drops to the voltage value V2 at the time point t7, and rises to the voltage value V3 at the time point t8, and drops again to voltage value V1 at time point t9. Then, the reservoir device 100a performs the read operation rd again at the time point t9, and the voltage V_SN of the storage node SN is equal to the voltage value V1, which is reflected in the read current I_TR of the transistor TR.

The reservoir device 100a performs 9 times of write operations wrt and 3 times of read operations rd between the time point to and the time point 19. The above 9 times of write operations wrt and 3 times of read operations rd belong to an operating sequence. Then, the reservoir device 100a performs another operating sequence between the time point t10 and the time point t19, which also includes 9 times of write operations wrt and 3 times of read operations rd. Between the operating sequence from time point t0 to time point t9 and the operating sequence from time point t10 to time point t19, the reservoir device 100a may perform a refresh operation refh to refresh the voltage V_SN of the storage node SN as 0V.

During the operating sequence from the time point t10 to the time point t19, the reservoir device 100a performs three times of write operations wrt between the time point t10 and the time point t13, and the gate g1 of the transistor TW respectively receives logic values "0", logical value "1" and logical value "1", the voltage V_SN of the storage node SN is maintained at 0V at the time point t11, and continues to rise to the voltage value V2 at the time point t12~time point t13. Then, the reservoir device 100a performs one time of read operation rd at time point t13. Similarly, next, the reservoir device 100a performs three times of write operations wrt between the time point t13 and the time point t16, and the gate g1 of the transistor TW respectively receives logic value "1", logic value "0" and logic value "0". The voltage V_SN of the storage node SN rises to the voltage value V3 at the time point t14, and continues to drop to 0V from the time point t14 to time point t16. Then, the reservoir device 100a performs one time of read operation rd at time point t16. Next, the reservoir device 100a performs three times of write operations wrt between the time point t16 and the time point t19, the voltage V_SN of the storage node SN rises to the voltage value V1 at the time point t17, and drops to 0V at the time point t18, and then rises to V1 again at time point t19. Then, the reservoir device 100a performs one time of read operation rd at time point t19.

In the embodiment of FIG. 2, the reservoir device 100a firstly performs 3 times of write operations wrt and then performs 1 time of read operation rd. In another example, the reservoir device 100a may perform 1 time of read operation rd after every write operation wrt. Moreover, the refresh operation refh between the operation sequence from time point t0 to time point t9 and the operation sequence from time point t10 to time point t19 is optional. If the voltage V_SN of the storage node SN has returned to 0V after the operation sequence from the time point t0 to the time point t9, then the refresh operation refh does not need to be performed at the time point t10.

Figure 3A:
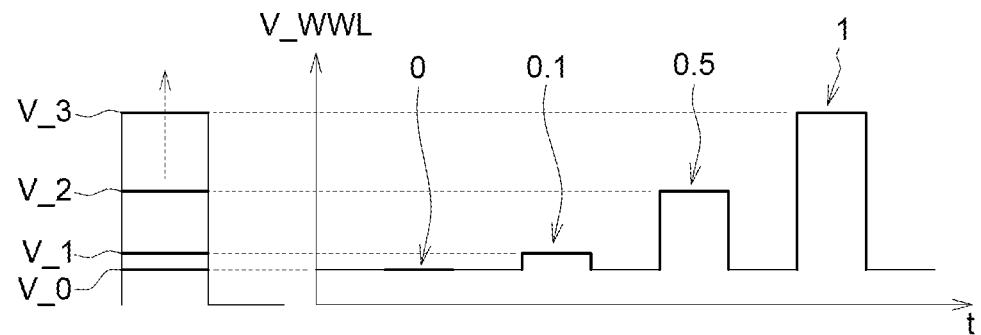
FIGS. 3A and 3B are schematic diagrams of modulation schemes of the input voltage V_WWL received by the reservoir device 100a of FIG. 1.
Figure 3B:
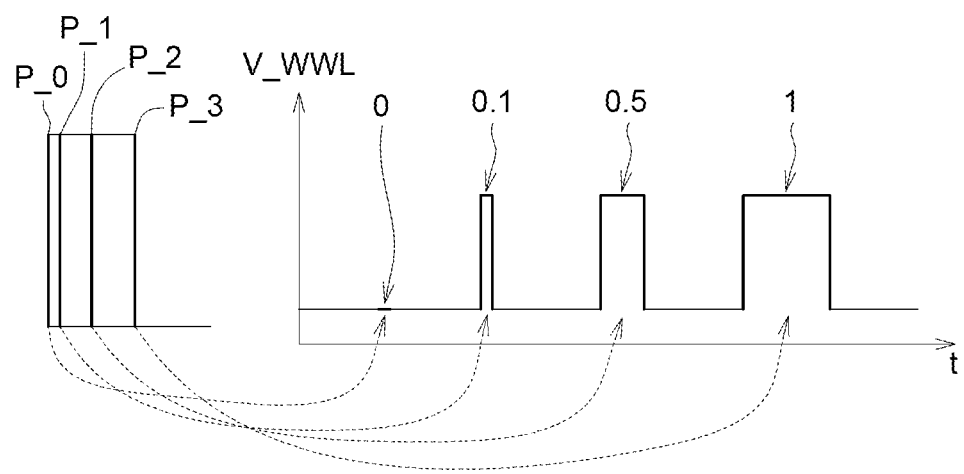

FIGS. 3A and 3B are schematic diagrams of modulation schemes of the input voltage V_WWL received by the reservoir device 100a of FIG. 1. The input voltage V_WWL may be in analog form, multi-level form or digital form. When the input voltage V_WWL is, for example, in analog form, the modulation scheme of the input voltage V_WWL may utilize amplitude modulation or pulse width modulation.

As shown in FIG. 3A, when the input voltage V_WWL utilizes the amplitude modulation, the voltage amplitudes V_0, V_1, V_2 and V_3 of the input voltage V_WWL respectively indicate the analog values "0", "0.1", "0.5" and "1.0" of the input voltage V_WWL.

On the other hand, as shown in FIG. 3B, when the input voltage V_WWL utilizes the pulse width modulation, the pulse widths P_0, P_1, P_2 and P_3 of the input voltage V_WWL respectively indicate the analog values "0", "0.1", "0.5" and "1.0" of the input voltage V_WWL.

Figure 4A:
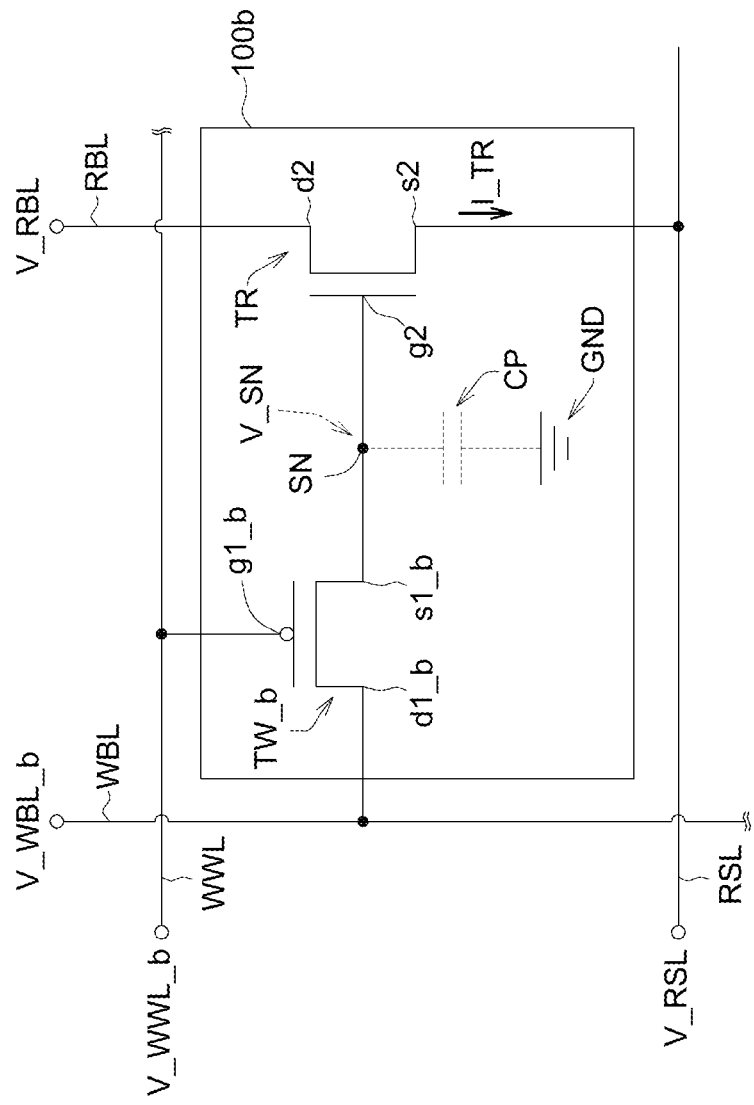
FIG. 4A is a circuit diagram of a reservoir device 100b according to another embodiment of the present disclosure.

FIG. 4A is a circuit diagram of a reservoir device 100b according to another embodiment of the present disclosure.

The reservoir device 100*b* in FIG. 4A is similar to the reservoir device 100*a* in FIG. 1, except that, the transistor TW_b of the reservoir device 100*b* in FIG. 4A is a P-type metal oxide semiconductor transistor (PMOS). Therefore, the logic value received by the gate g1_*b* of the transistor TW_b in FIG. 4A is complementary to the logic value received by the gate g1 of the NMOS transistor TW in FIG. 1.

Figure 4B:
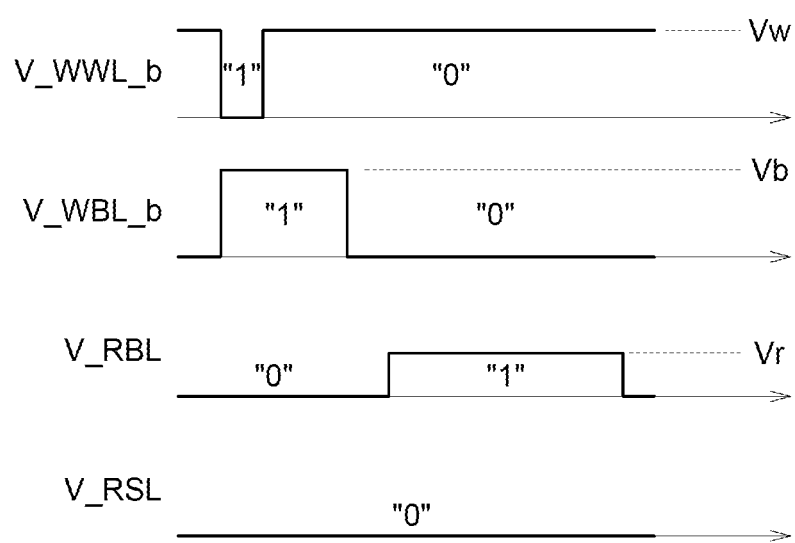
FIG. 4B is a waveform diagram of each input voltage of the reservoir device 100b in FIG. 4A.

FIG. 4B is a waveform diagram of each input voltage of the reservoir device 100*b* in FIG. 4A. Please refer to both FIGS. 4A and 4B, the gate g1_*b* of the transistor TW_b of the reservoir device 100*b* receives the input voltage V_WWL_b through the write word line WWL. When the input voltage V_WWL_b is equal to the voltage value Vw, it means that the gate g1_*b* receives a logic value "0". When the input voltage V_WWL_b is equal to 0V (or a low voltage value lower than the voltage value Vw), it means that the gate g1_*b* receives a logic value "1". The drain d1_*b* of the transistor TW_b receives the input voltage V_WBL_b through the write bit line WBL. When the input voltage V_WBL_b is equal to the voltage value Vb, it means that the drain d1_*b* receives a logic value "1". Therefore, when the reservoir device 100*b* in FIG. 4A performs a write operation to write a logic value "1", the gate g1_*b* of the transistor TW_b receives an input voltage V_WWL_b of 0V (or equal to a low voltage value), and drain d1_*b* receives an input voltage V_WBL_b equal to the voltage value Vb.

On the other hand, the transistor TR in FIG. 4A is an NMOS transistor, which is the same as the transistor TR in FIG. 1. When the input voltage V_RBL received by the drain d2 of the transistor TR is equal to the voltage value Vr, it means that the drain d2 receives a logic value "1". When the input voltage V_RSL received by the source s2 of the transistor TR is equal to 0V (or equal to a low voltage value), it means that the source s2 receives a logic value "0".

FIGS. 5A-5D are circuit diagrams of reservoir devices 100-1 to 100-4 of other embodiments of the present disclosure. In addition to the parasitic capacitance for the storage nodes SN of the reservoir devices 100-1 to 100-4 in FIGS. 5A-5D, the storage nodes SN may also be coupled to at least one physical capacitor, and voltage V_SN of the storage nodes SN may be maintained by the at least one physical capacitor. The physical capacitor(s) is/are, for example, disposed during the manufacturing process of the reservoir devices 100-1 to 100-4. The reservoir devices 100-1 to 100-4 in FIGS. 5A-5D are referred to as "2TXC" architecture, where "X" represents the number of physical capacitors.

Figure 5A:
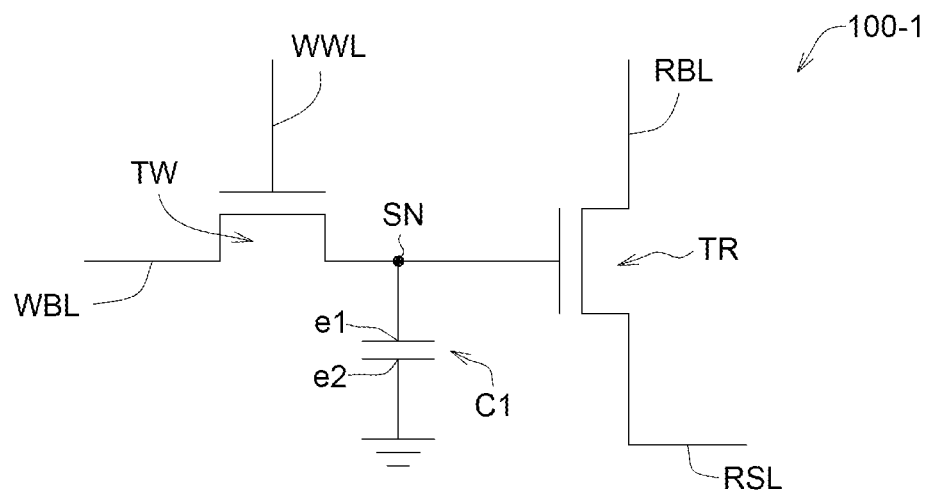
FIGS. 5A-5D are circuit diagrams of reservoir devices 100-1 to 100-4 of other embodiments of the present disclosure.

Please refer to FIG. 5A firstly, the storage node SN of the reservoir device 100-1 is coupled to a physical capacitor C1, which is referred to as a "2T1C" architecture. One terminal e1 of the capacitor C1 is coupled to the storage node SN, and the other terminal e2 of the capacitor C1 is coupled to the ground node GND.

Figure 5B:
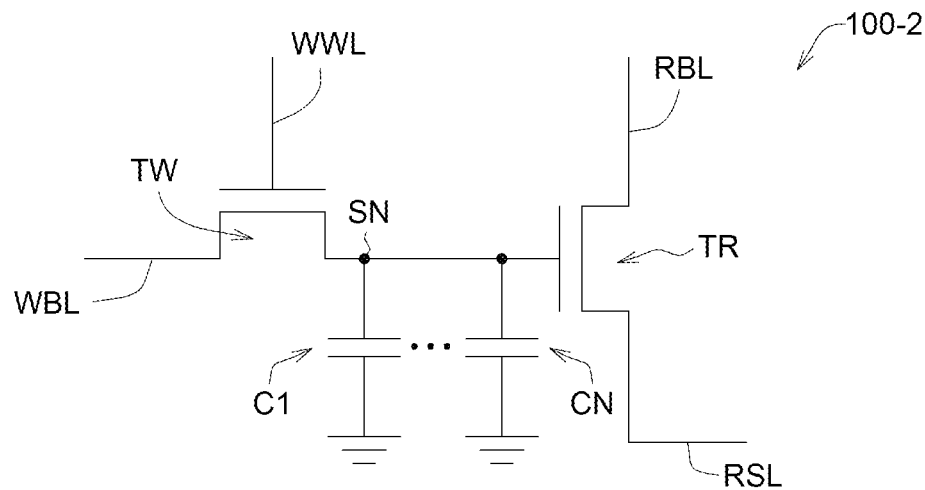

Next, referring to FIG. 5B, the storage node SN of the reservoir device 100-2 is coupled to N physical capacitors C1-CN, which is referred to as a "2TNC" architecture. The capacitors C1-CN are coupled to each other in parallel, for example.

Figure 5C:
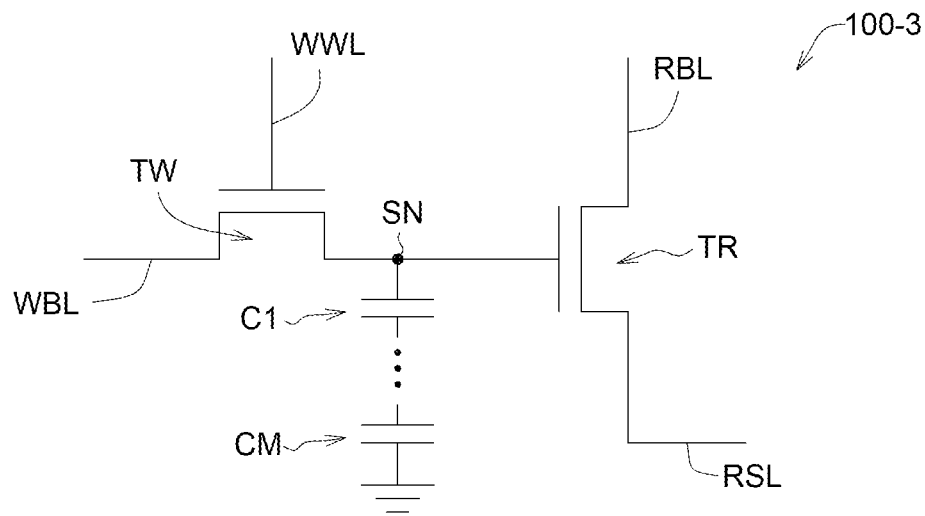

Next, referring to FIG. 5C, the storage node SN of the reservoir device 100-3 is coupled to M physical capacitors C1-CM. The capacitors C1-CM are coupled to each other in series, for example.

Figure 5D:
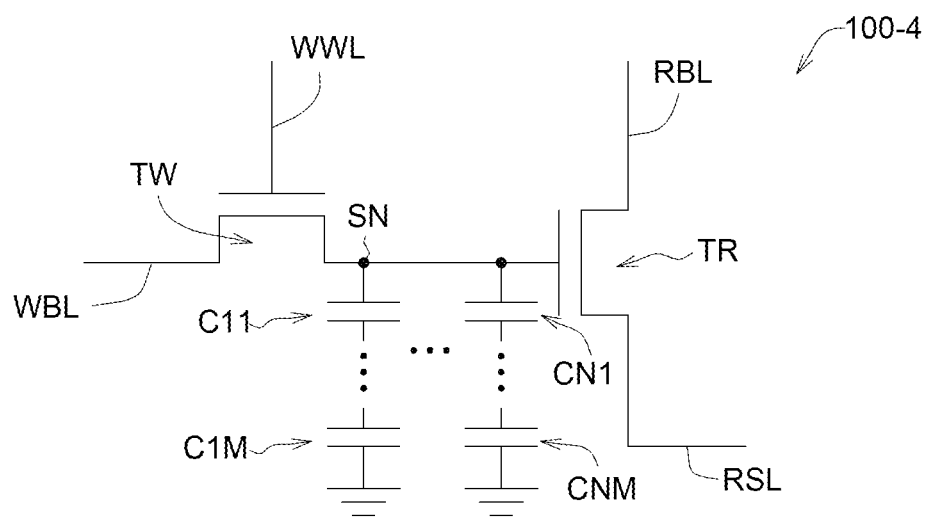

Next, referring to FIG. 5D, the storage node SN of the reservoir device 100-4 is coupled to N×M physical capacitors C11-CNM. The capacitors C11-C1M disposed in the first vertical column are coupled to each other in series, and so on, and the capacitors CN1-CNM disposed in the N th vertical column are coupled to each other in series. The capacitors between different vertical columns are coupled in parallel.

Figure 6:
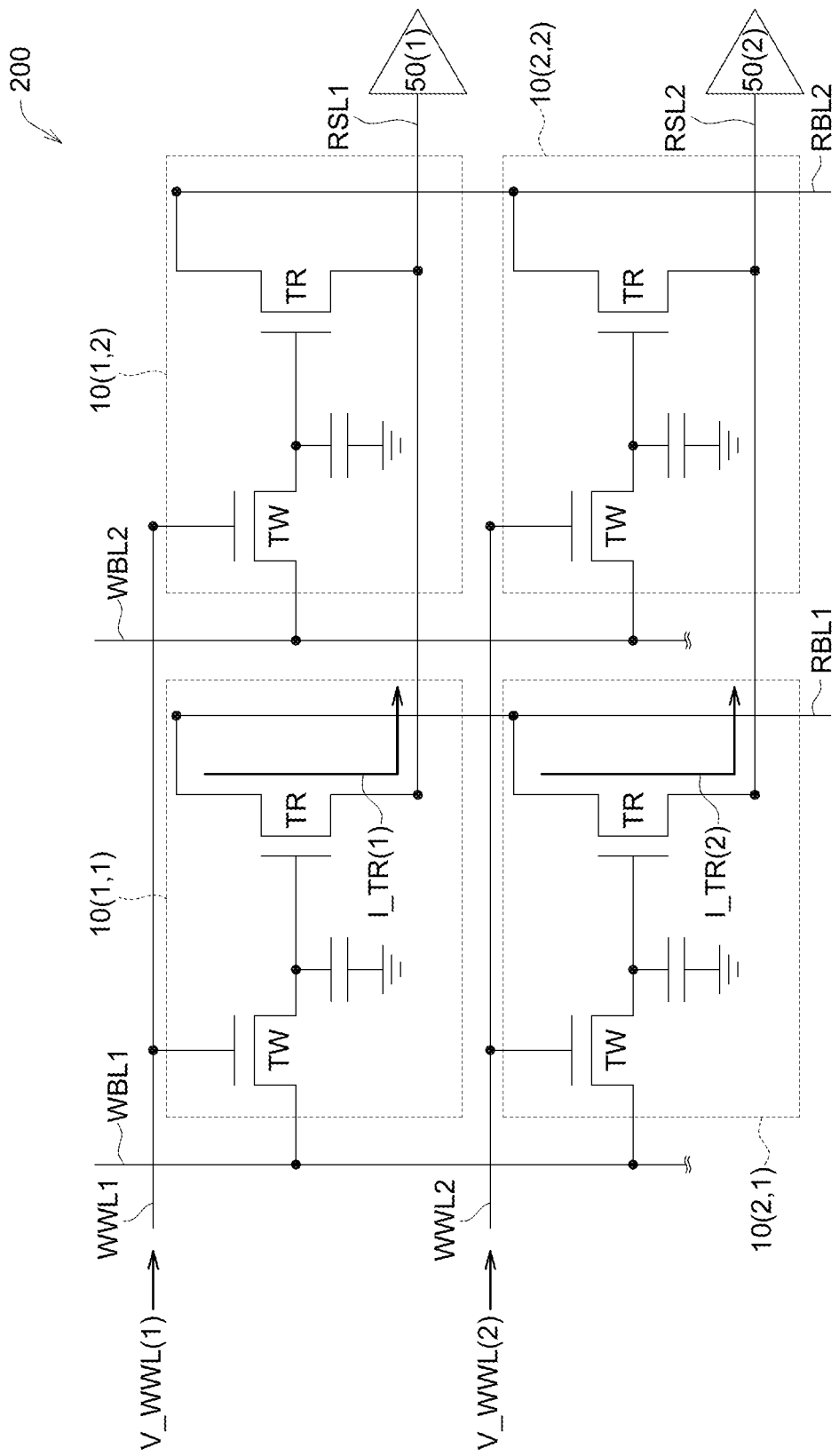
FIG. 6 is a circuit diagram of a reservoir array 200 according to other embodiments of the present disclosure.

FIG. 6 is a circuit diagram of a reservoir array 200 according to other embodiments of the present disclosure. Please refer to FIG. 6, the reservoir array 200 includes reservoir elements 10(1,1), 10(1,2), 10(2,1) and 10(2,2). Each of the reservoir elements 10(1,1)-10(2,2) may be realized by the reservoir device 100*a* of FIG. 1, the reservoir device 100*b* of FIG. 4A, or the reservoir device 100-1 to 100-4 of FIGS. 5A-5D.

The reservoir array 200 has a plurality of vertical columns and a plurality of horizontal rows, e.g., a first vertical column, a second vertical column, a first horizontal row and a second horizontal row. The reservoir elements 10(1,1), 10(1,2), 10(2,1) and 10(2,2) are arranged in an array form. The reservoir elements 10(1,1) and 10(1,2) are arranged in the first horizontal row, and the transistors TW of the reservoir elements 10(1,1) and 10(1,2) are jointly coupled to write word line WWL1 to receive the input voltage V_WWL (1). Moreover, the transistors TR of the reservoir elements 10(1,1) and 10(1,2) are jointly coupled to the read source line RSL1, so as to transmit the read current I_TR (1) to sensing circuit 50(1) through the read source line RSL1.

Similarly, the reservoir elements 10(2,1) and 10(2,2) are arranged in the second horizontal row, and the transistors TW of the reservoir elements 10(2,1) and 10(2,2) are jointly coupled to the write word line WWL2 to receive the input voltage V_WWL (2). Moreover, the transistors TR of the reservoir elements 10(2,1) and 10(2,2) are jointly coupled to the read source line RSL2, so as to transmit the read current I_TR(2) to sensing circuit 50(2) through the read source line RSL2. The sensing circuits 50(1) and 50(2) are, for example, sensing amplifiers (SA).

On the other hand, the reservoir elements 10(1,1) and 10(2,1) are arranged in the first vertical column, and the transistors TW of the reservoir elements 10(1,1) and 10(2,1) are jointly coupled to the write bit line WBL1, and the transistors TR are jointly coupled to the read bit line RBL1. Similarly, the reservoir elements 10(1,2) and 10(2,2) are arranged in the second vertical column, and the transistors TW of the reservoir elements 10(1,2) and 10(2,2) are jointly coupled to the write bit line WBL2, the transistors TR are jointly coupled to the read bit line RBL2.

Figure 7A:
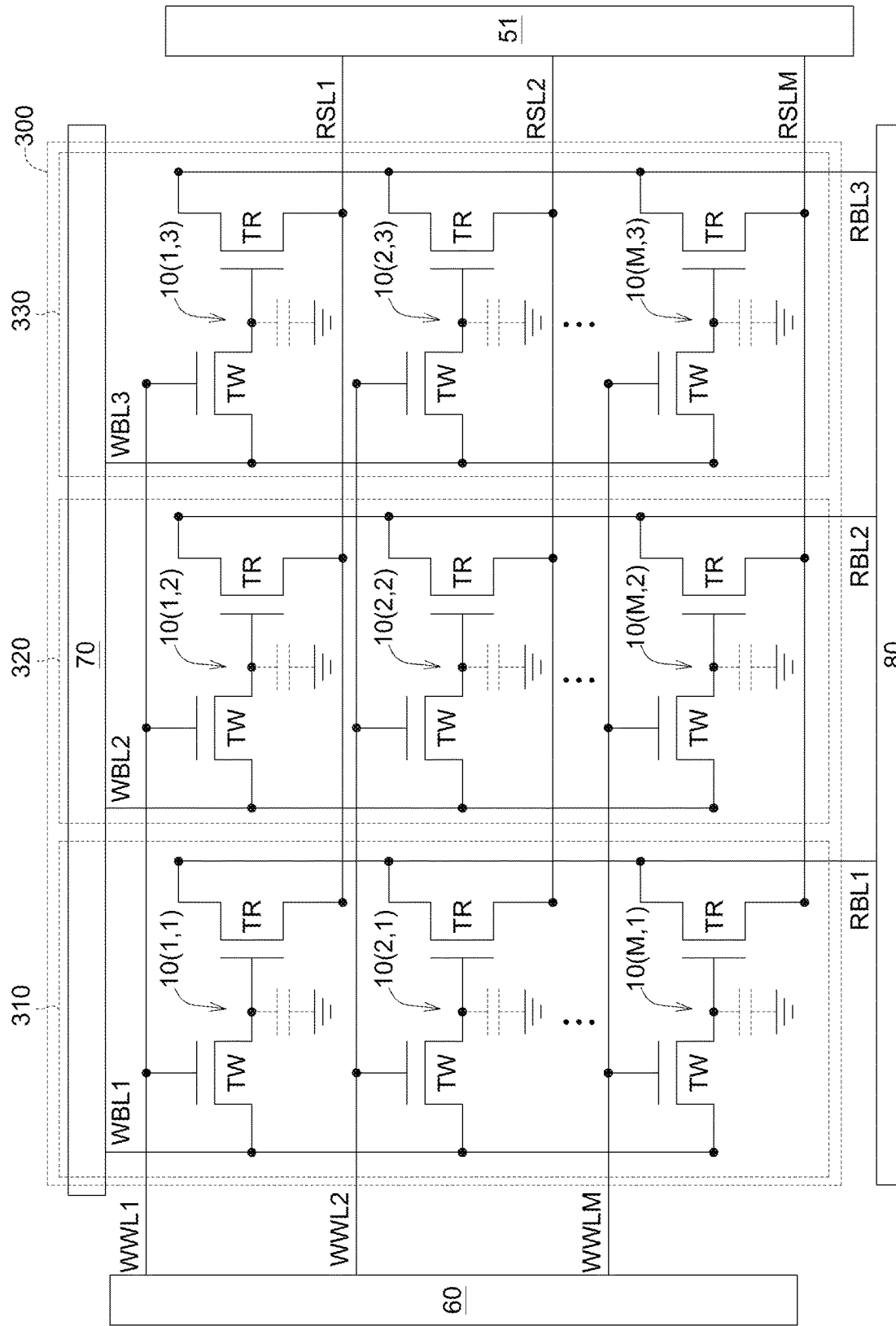
FIG. 7A is a circuit diagram of a reservoir array 300 according to other embodiments of the present disclosure.
Figure 7B:
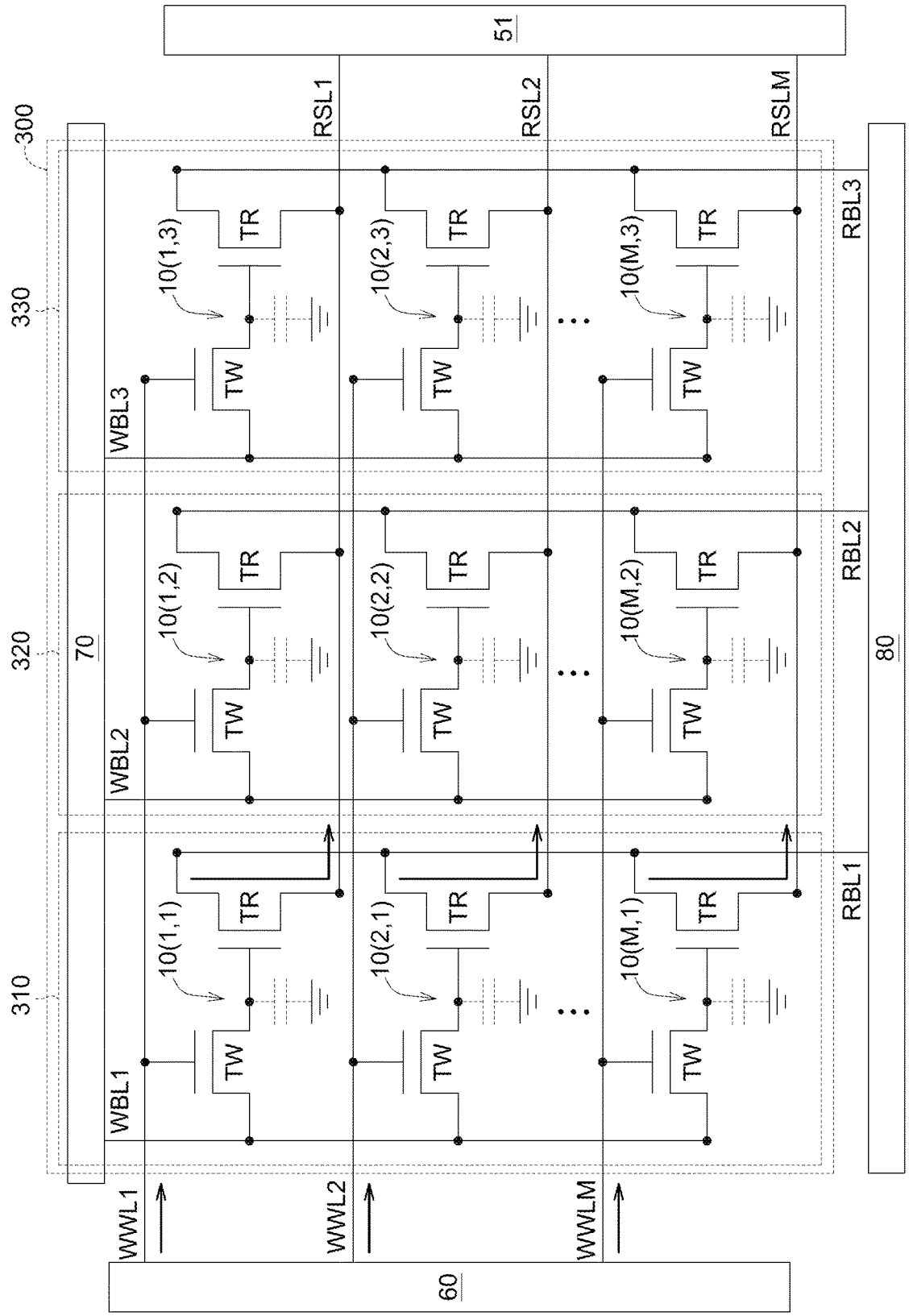
FIGS. 7B-7E are schematic views of the operation of the reservoir array 300 of FIG. 7A.

FIG. 7A is a circuit diagram of a reservoir array 300 according to other embodiments of the present disclosure. Please refer to FIG. 7A, the reservoir array 300 is similar to the reservoir array 200 in FIG. 6, and the reservoir array 300 includes a plurality of reservoir elements 10(1,1)-10(M,3), which are arranged in an array form. Each of the reservoir elements 10(1,1)-10(M,3) may be realized by the reservoir device 100*a* of FIG. 1, the reservoir device 100*b* of FIG. 4A, or the reservoir device 100-1 to 100-4 of FIGS. 5A-5D.

The reservoir array 300 has a first vertical column, a second vertical column and a third vertical column, and has a first horizontal row, a second horizontal row, . . . , a M-th horizontal row. The transistors TW of the reservoir elements 10(1,1)-10(1,3) in the first horizontal row are jointly coupled to the write word line WWL1. The write word line WWL1 is coupled to a decoding circuit 60, such as a write word line decoder. Moreover, the transistors TR of the reservoir elements 10(1,1)-10(1,3) are jointly coupled to the read source line RSL1. The read source line RSL1 is coupled to the decoding circuit 51, and the decode circuit 51 includes, for example, a read source line decoder and a sensing amplifier.

Similarly, the transistors TW of the reservoir elements 10(2,1)-10(2,3) in the second vertical column are jointly coupled to the write word line WWL2. The write word line WWL2 is coupled to the decoding circuit 60. Moreover, the transistors TR of the reservoir elements 10(2,1)-10(2,3) are jointly coupled to the read source line RSL2. The read source line RSL2 is coupled to the decoding circuit 51. The transistors TW of the reservoir elements 10 (M,1)-10(M,3) in the M-th vertical column are coupled to the decoding circuit 60 through the write word line WWLM. Moreover, the transistors TR of the reservoir elements 10(M,1)-10(M,3) are coupled to the decoding circuit 51 through the read source line RSLM.

The transistors TW of the reservoir elements 10(1,1)-10(M,1) in the first vertical column are coupled to the decoding circuit 70 through the write bit line WBL1, and the decoding circuit 70 is, for example, a write bit line decoder. Furthermore, the transistors TR of the reservoir elements 10(1,1)-10(M,1) are coupled to the decoding circuit 80 through the read bit line RBL1, and the decoding circuit 80 is, for example, a read bit line decoder.

Similarly, the transistors TW of the reservoir elements 10(1,2)-10(M,2) in the second vertical column are coupled to the decoding circuit 70 through the write bit line WBL2. Moreover, the transistors TR of the reservoir elements 10(1,2)-10(M,2) are coupled to the decoding circuit 80 through the read bit line RBL2. The transistors TW of the reservoir elements 10(1,3)-10(M,3) in the third vertical column are coupled to the decoding circuit 70 through the write bit line WBL3. Moreover, the transistors TR of the reservoir elements 10(1,3)-10(M,3) are coupled to the decoding circuit 80 through the read bit line RBL3.

In one example, the reservoir elements 10(1,1)-10(M,3) of the entire array may be used as a reservoir array 300 as a whole. In another example, each of the reservoir elements 10(1,1)-10(M,3) may be independently used as a reservoir device.

In yet another example, the reservoir elements 10(1,1)-10(M,1) of the first vertical column may form a reservoir device 310. Similarly, the reservoir elements 10(1,2)-10(M,2) in the second vertical column may form another reservoir device 320, and the reservoir elements 10(1,3)-10(M,3) of the third vertical column may form yet another reservoir device 330. That is, reservoir elements of each vertical column may form an independent reservoir device.

FIGS. 7B-7E are schematic views of the operation of the reservoir array 300 of FIG. 7A. Please refer to FIG. 7B firstly, only reservoir elements of one vertical column is operated at a time. For example, only the reservoir device 310 formed by the reservoir elements 10(1,1)-10(M,1) of the first vertical column is operated in the time interval T1.

Figure 7C:
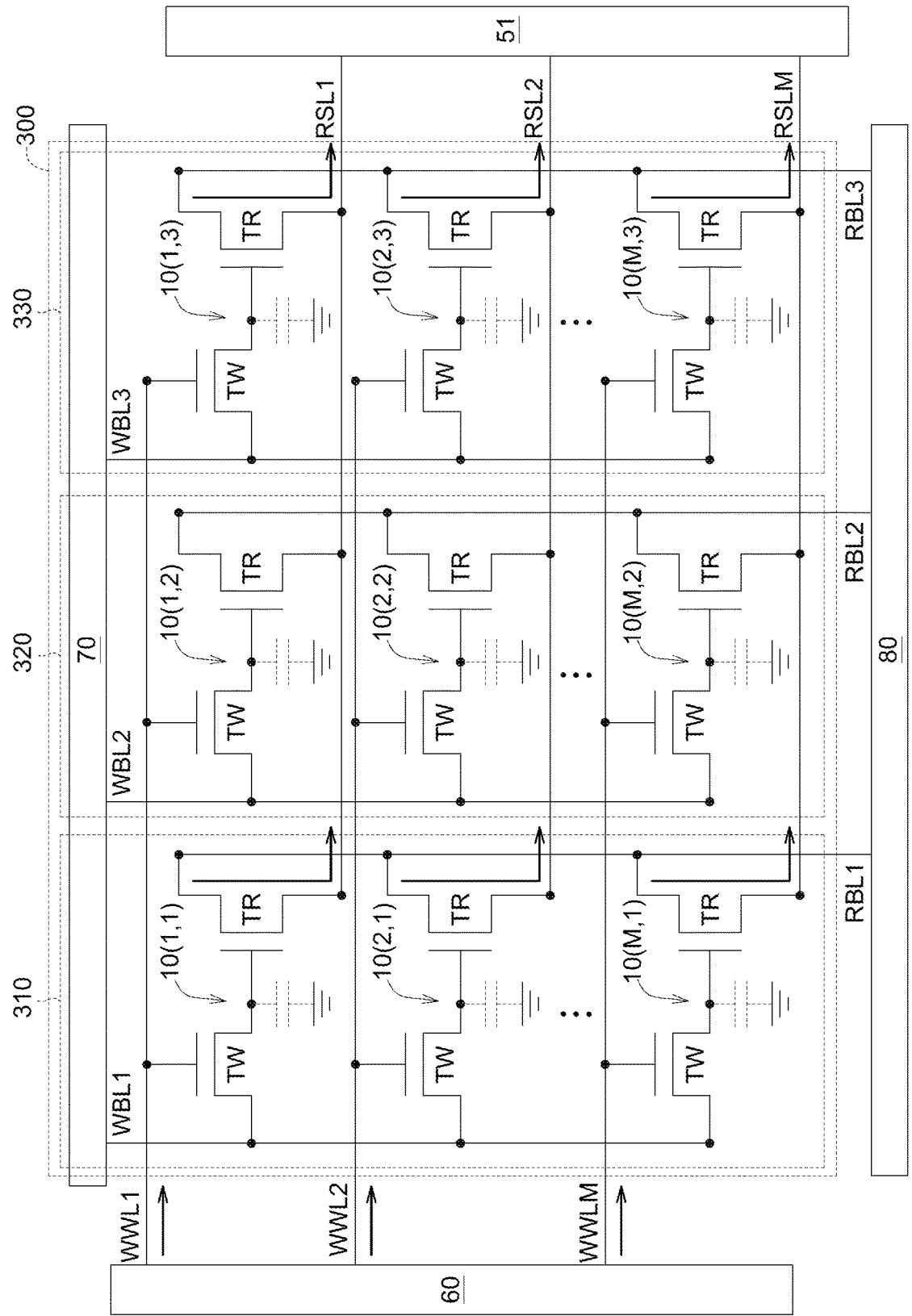

Next, referring to FIG. 7C, reservoir elements of multiple vertical columns may also be operated at the same time. For example, the reservoir device 310 of the first vertical column and the reservoir device 330 of the third vertical column may be operated in the time interval T1.

Figure 7D:
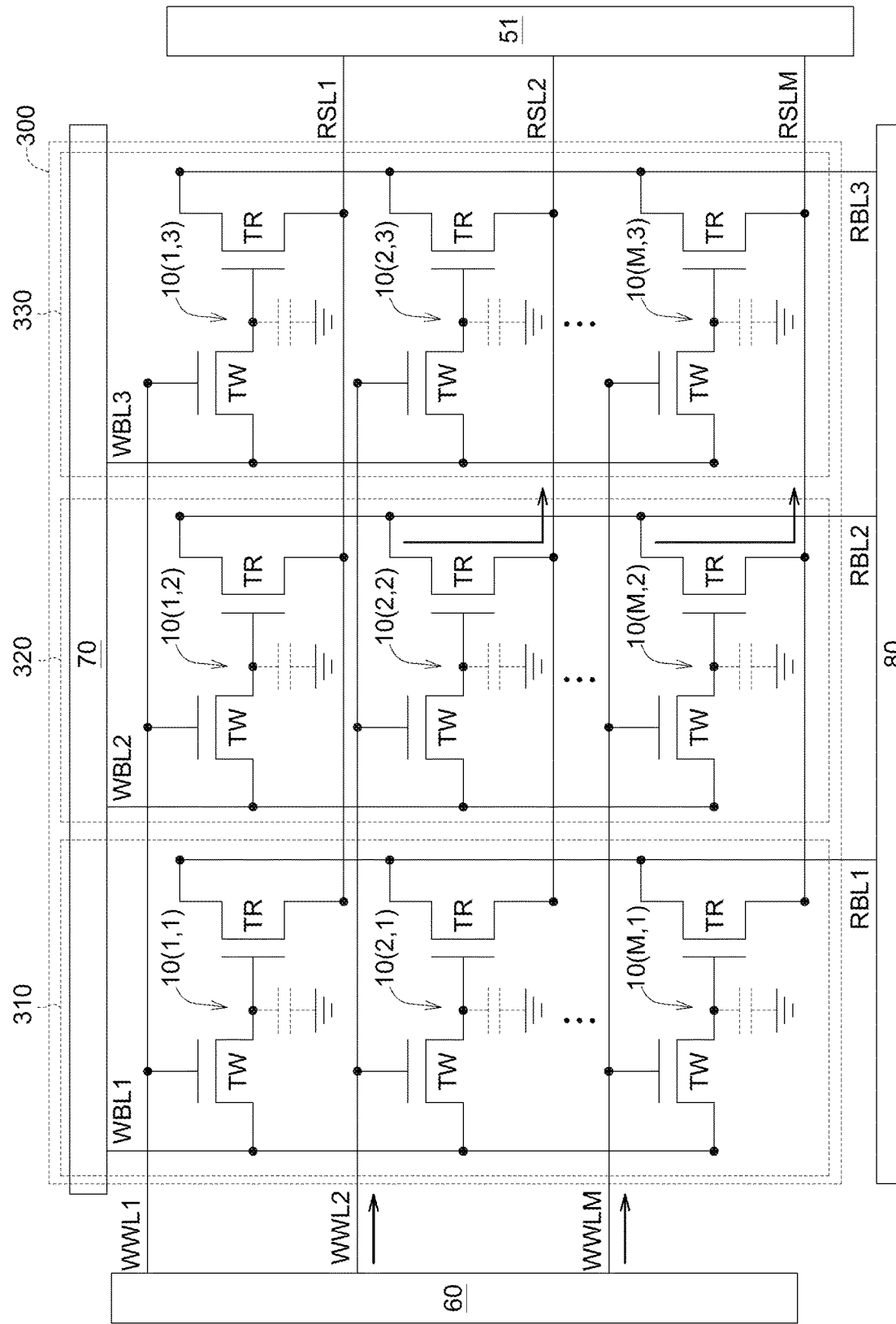

Next, referring to FIG. 7D, only a portion of the reservoir elements in one vertical column are operated at a time. For example, only two reservoir elements 10(2,2) and 10(M,2) in the reservoir device 320 in the second vertical column are operated in the time interval T1.

Figure 7E:
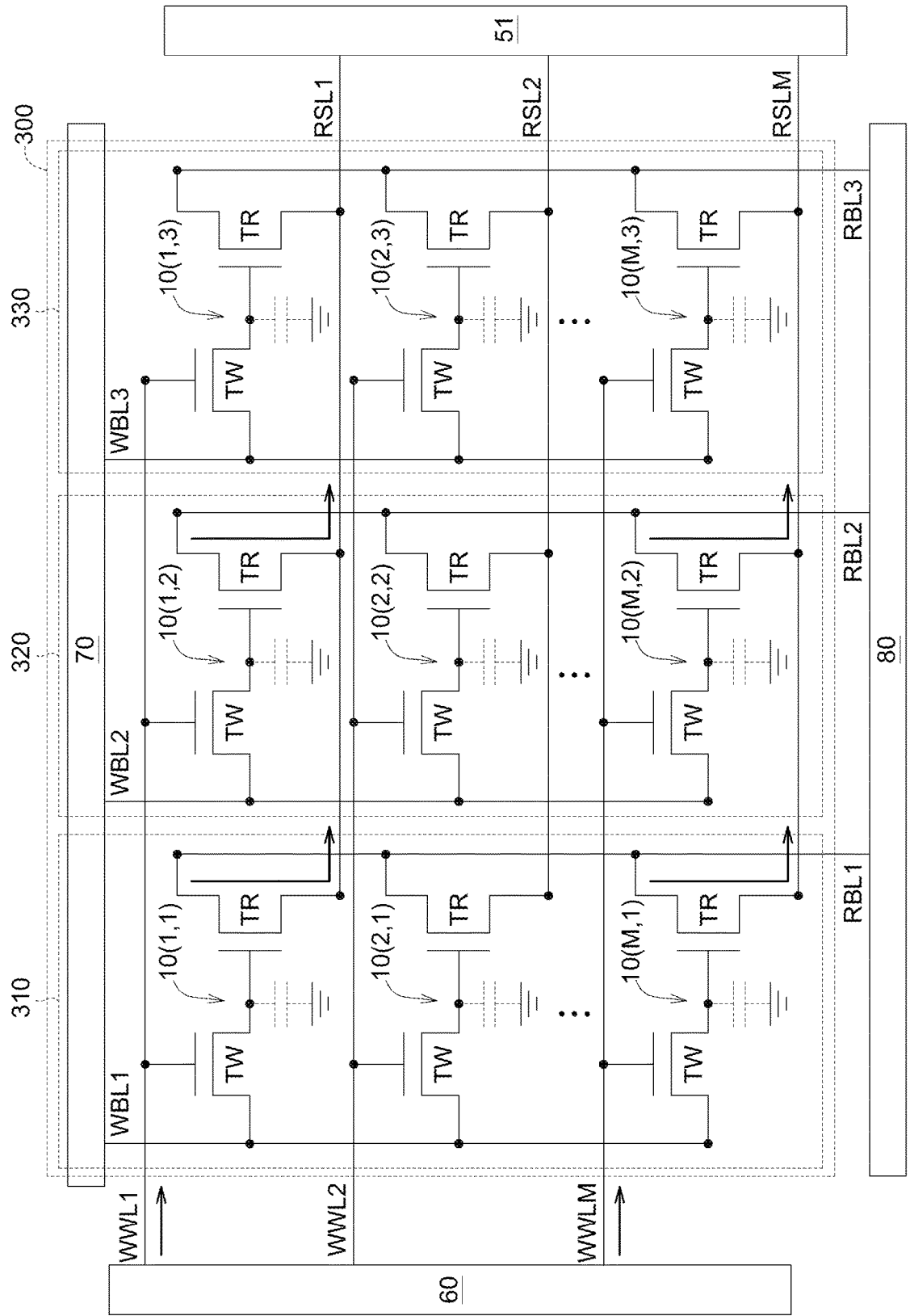

Next, referring to FIG. 7E, at the same time, it is also possible to operate part of the reservoir elements in multiple vertical column. For example, in the time interval T1, two reservoir elements 10(1,1) and 10(M,1) in the reservoir device 310 of the first vertical column may be operated, and two reservoir elements 10(1,2) and 10(M,2) in the reservoir device 320 of the second vertical column may be operated.

Figure 8A:
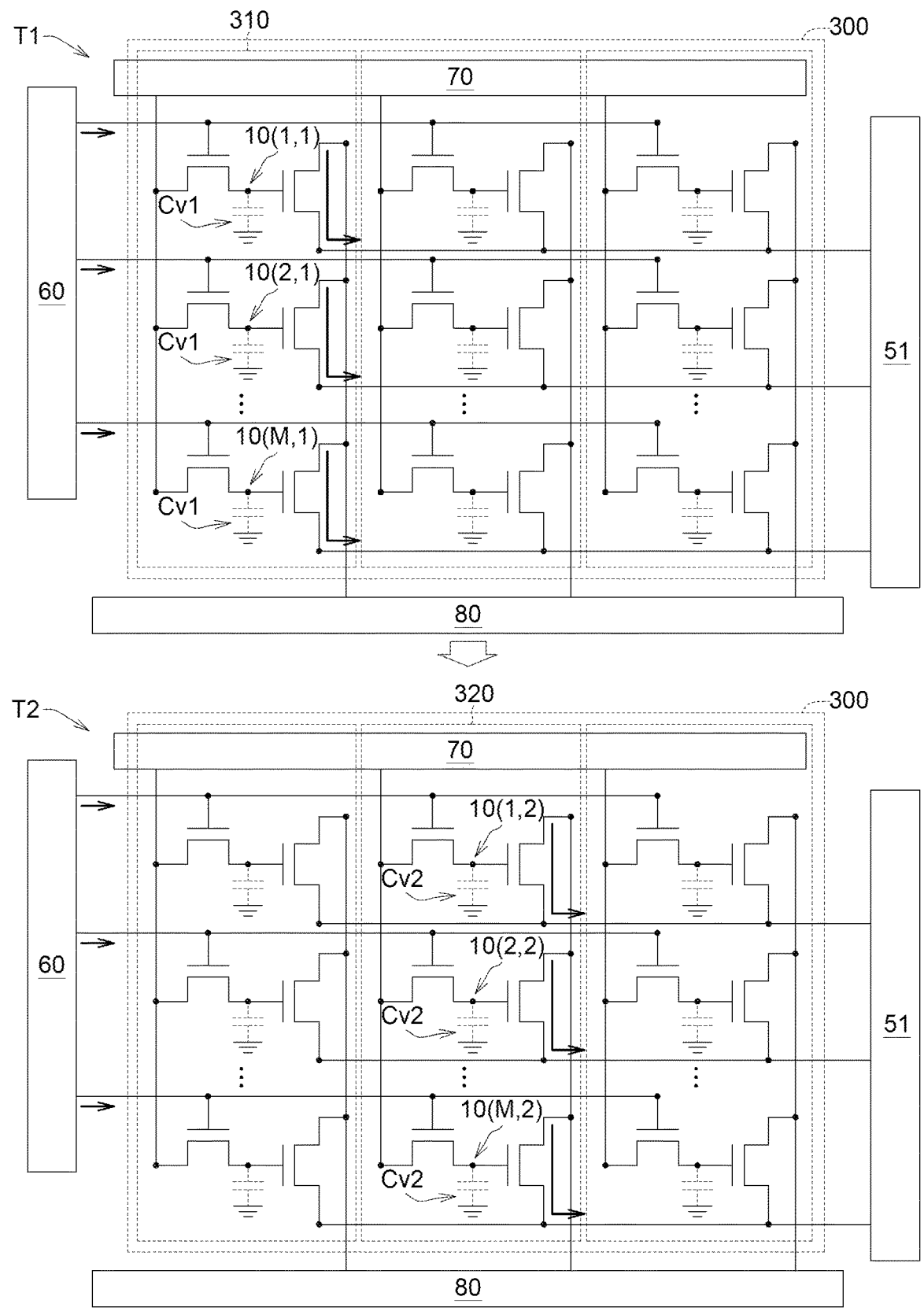
FIG. 8A is a schematic diagram of the operation of reservoir devices 310, 320 and 330 of different vertical columns.

FIG. 8A is a schematic diagram of the operation of reservoir devices 310, 320 and 330 of different vertical columns. Referring to FIG. 8A, in the reservoir array 300, the reservoir devices 310, 320 and 330 in different vertical columns receive the same input voltage through the write word lines WWL1-WWLM. For example, the input voltages received by the reservoir device 310 of the first vertical column through the write word lines WWL1-WWLM are equal to the input voltages received by the reservoir device 320 of the second vertical column through the write word lines WWL1-WWLM.

Moreover, the reservoir devices 310, 320 and 330 have different capacitance values. For example, the capacitors of each of the reservoir elements 10(1,1)-10(M,1) of reservoir device 310 in the first vertical column have capacitance value Cv1. In addition, the capacitors of each of the reservoir elements 10(1,2)-10(M,2) of reservoir device 320 in the second vertical column have capacitance value Cv2. The capacitance value Cv1 of the capacitors in the first vertical column is not equal to the capacitance value Cv2 of the capacitors in the second vertical column. On the other hand, the capacitance Cv3 (not shown in the figure) of the capacitors in the third vertical column is also different from the capacitances values Cv1 and Cv2.

In the embodiment shown in FIG. 8A, the operations of the reservoir devices 310-330 of different vertical columns are sequentially performed at different times. For example, the reservoir device 310 of the first vertical column is executed in the time interval T1, and the reservoir device 320 of the second vertical column is executed in the next time interval T2. On the other hand, in the next time interval, the reservoir device 330 (not shown in the figure) of the second vertical column may be executed.

Figure 8B:
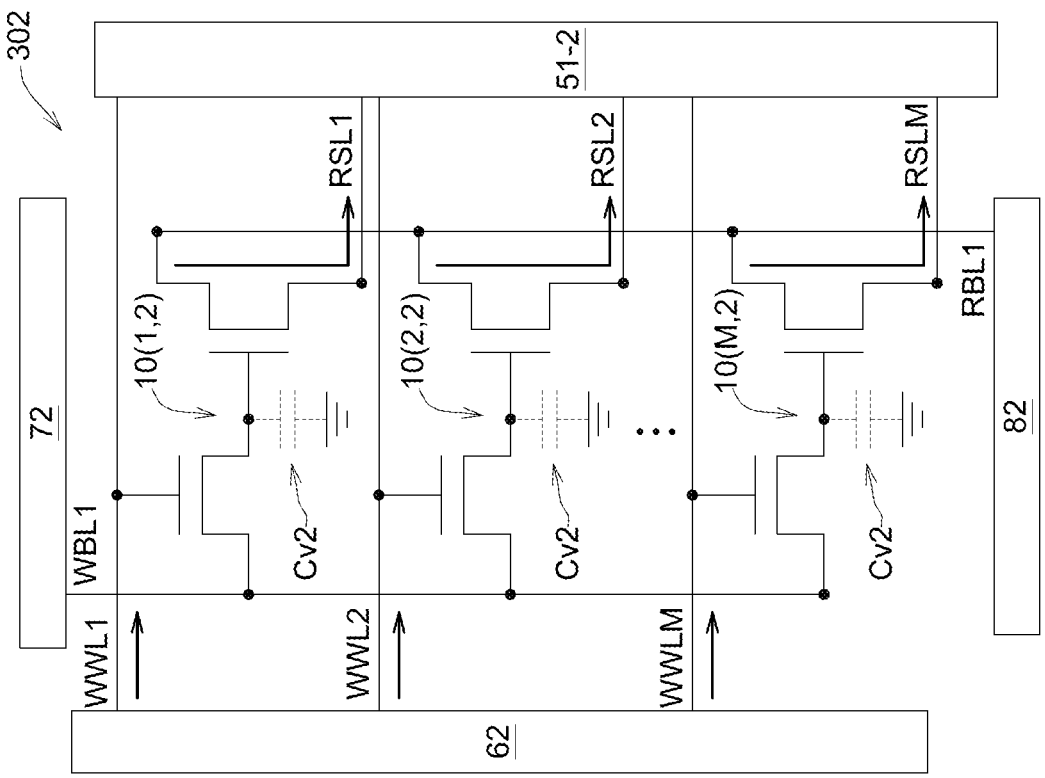
FIG. 8B is a schematic diagram of the operation of reservoir devices 301 and 302.
Figure 8B:
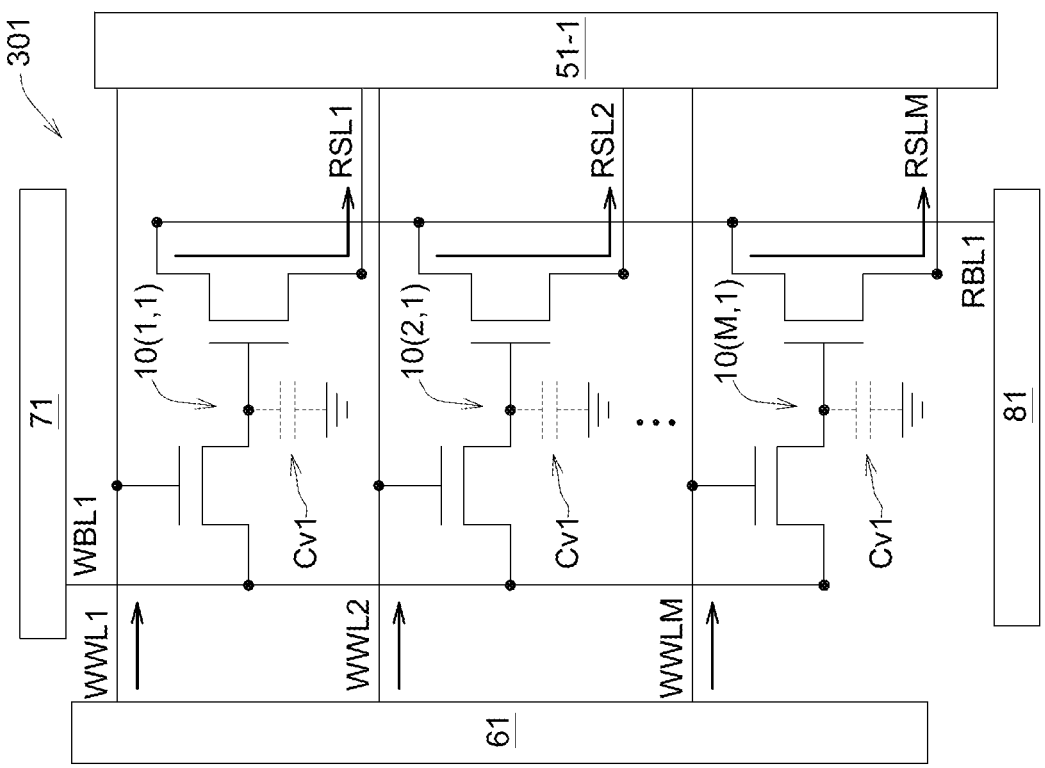

FIG. 8B is a schematic diagram of the operation of reservoir devices 301 and 302. The reservoir array 300 in FIG. 8A may be divided into three independent reservoir devices according to different vertical columns. FIG. 8B shows two independent reservoir devices 301 and 302 as an example.

Regarding operational function, the reservoir device 301 corresponds to the reservoir device 310 of the first vertical column in FIG. 8A, the reservoir device 302 corresponds to the reservoir device 320 of the second vertical column in FIG. 8A.

The reservoir devices 301 and 302 operate sequentially, with their respective decoding circuits. For example, the write word lines WWL1-WWLM of the reservoir device 301 are coupled to the decoding circuit 61, the write bit line WBL1 is coupled to the decoding circuit 71, and the read source lines RSL1-RSLM are coupled to the decoding circuit 51-1. The read bit line RBL1 is coupled to the decoding circuit 81. Also, the capacitors of each of the reservoir elements 10(1,1)-10(M,1) in the reservoir device 301 have capacitance value Cv1.

On the other hand, the write word lines WWL1-WWLM of the reservoir device 302 are coupled to the decoding circuit 62, the write bit line WBL2 is coupled to the decoding circuit 72, and the read source lines RSL1-RSLM are coupled to the decoding circuit 51-2, the read bit line RBL2 is coupled to the decoding circuit 82. Also, the capacitors of each of the reservoir elements 10(1,2)-10(M,2) in the reservoir device 302 have capacitance value Cv2. The capacitance value Cv2 is not equal to the capacitance value Cv1.

In operation, the reservoir devices 301 and 302 each receives the same input voltage through the write word lines WWL1-WWLM. The reservoir device 301 may be executed in the time interval T1, and the reservoir device 302 may be executed in the next time interval T2. The execution result of the embodiment in FIG. 8B is substantially the same as: in the embodiment in FIG. 8A, the reservoir device 310 of the first vertical column is executed in the time interval T1, and the reservoir device 320 of the second vertical column is executed in next time interval T2. Alternatively, in another embodiment of FIG. 8B, the reservoir devices 301 and 302 may be executed simultaneously in the time interval T1.

Figure 9A:
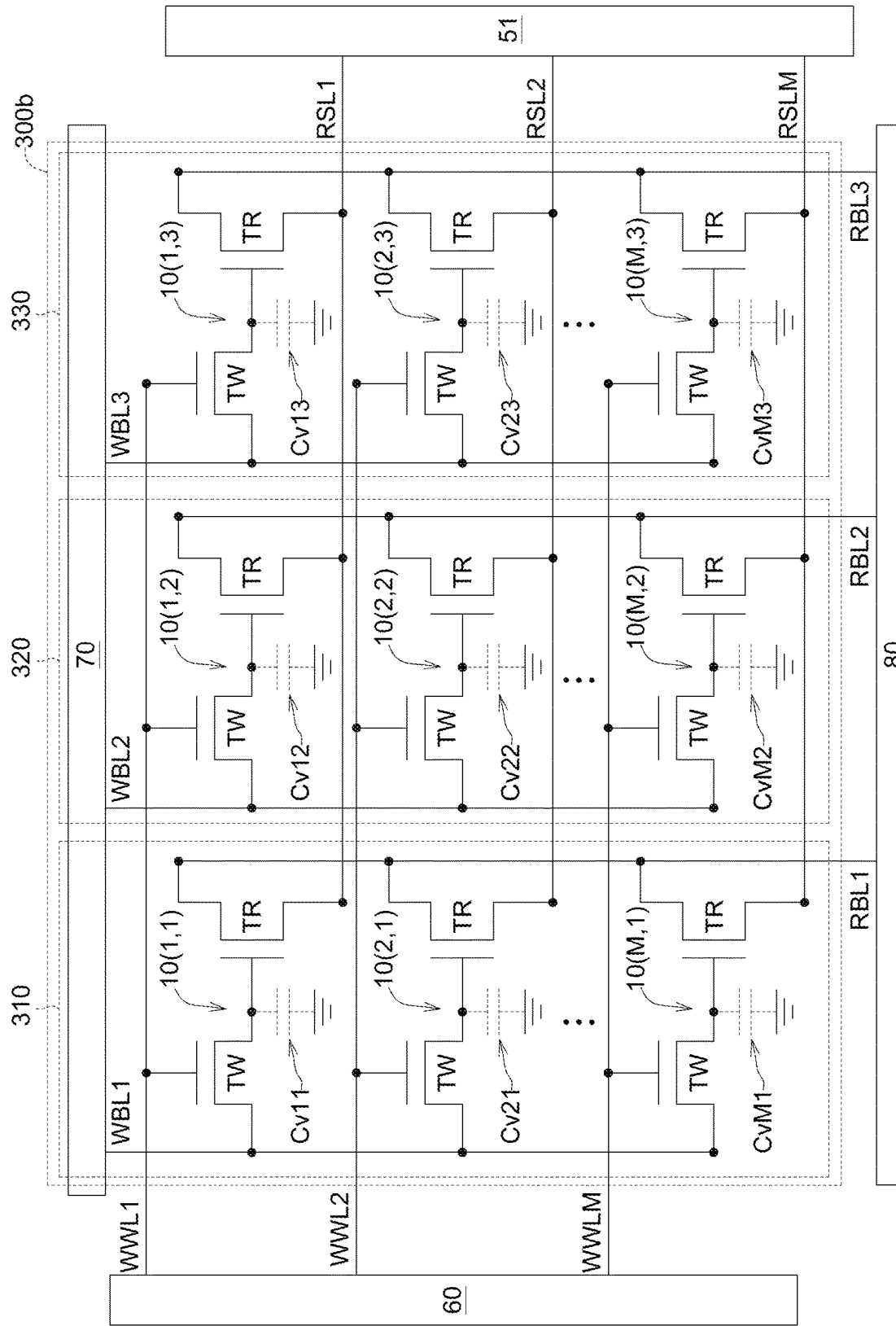
FIG. 9A is a circuit diagram of a reservoir array 300b of other embodiments of the present disclosure.

FIG. 9A is a circuit diagram of a reservoir array 300b of other embodiments of the present disclosure. The reservoir array 300b is another aspect of the reservoir array 300 in FIG. 7A. The capacitors of the reservoir elements 10(1,1)-10(M,3) of the reservoir array 300b in FIG. 9A have corresponding capacitance values Cv11-CvM3. According to different examples, the capacitance values Cv11-CvM3 may be equal or different.

In an example, the capacitance values of the reservoir elements in the same vertical column are equal, but the capacitance values of the reservoir elements in different vertical columns are different. For example, the capacitance values Cv11, Cv21, . . . , CvM1 of the capacitors in the reservoir device 310 of the first vertical column are all equal to the capacitance value Cv1. The capacitance values Cv12, Cv22, . . . , CvM2 of the capacitors in the reservoir device 320 of the second vertical column are all equal to the capacitance value Cv2. The capacitance values Cv13, Cv23, . . . , CvM3 of the capacitors in the reservoir device 330 of the third vertical column are all equal to the capacitance value Cv3. Moreover, the capacitance values Cv1, Cv2 and Cv3 are different from each other. The relationship between the above capacitance values are shown in formula (1-1) to formula (1-4):

$$C11 = C21 = \ldots = CM1 = C1 \quad (1-1)$$

$$C12 = C22 = \ldots = CM2 = C2 \quad (1-2)$$

$$C13 = C23 = \ldots = CM3 = C3 \quad (1-3)$$

$$C1 \neq C2 \neq C3 \quad (1-4)$$

In another example, the capacitance values Cv11, Cv21, . . . , CvM1 of the capacitors in the reservoir devices 310 in the first vertical column are different from one another. The capacitance values Cv12, Cv22, . . . , CvM2 of the capacitors in the reservoir devices 320 in the second vertical column may be partly the same and partly different. The capacitance values Cv13, Cv23, . . . , CvM3 of the capacitors in the reservoir devices 330 in the third vertical column are the same. The relationship between the above capacitance values are shown in formula (2-1) to formula (2-3):

$$C11 \neq C21 \neq \ldots \neq CM1 \quad (2-1)$$

$$C12 = C22 \neq \ldots \neq CM2 \quad (2-2)$$

$$C13 = C23 = \ldots = CM3 \quad (2-3)$$

Capacitance values Cv11-CvM3 of the capacitors of the reservoir elements 10(1,1)-10(M,3) may be adjusted in the following manner. For example, when the capacitors of the reservoir elements 10(1,1)-10(M,3) are parasitic capacitances, the doping concentration Nd of the P-N junction of the transistor TW may be changed to adjust the capacitor values Cv11-CvM3. Taking the capacitance value Cv11 of the capacitor of the reservoir element 10(1,1) as an example, the relationship between the capacitance value Cv11 and the doping concentration Nd of the P-N junction is shown in formula (3-1). Wherein, the capacitance value Cv11 is proportional to the ½ power of the doping concentration Nd. When the doping concentration Nd is reduced, a lower capacitance value Cv11 may be obtained.

$$Cv11 = Wd\sqrt{\frac{\varepsilon_{si}q(Nd)}{2(\varphi + V)}} \quad (3-1)$$

In another example or when the capacitors of the reservoir elements 10(1,1)~10(M,3) are parasitic capacitances, the capacitance values Cv11-CvM3 may be adjusted by changing the size of the transistor TR. Taking the capacitance value Cv11 of the capacitor of the reservoir element 10(1,1) as an example, the relationship between the capacitance value Cv11 and the length L and width W of the transistor TR, the equivalent capacitance value Cox of the oxide layer of the transistor TR, and the overlapping equivalent capacitance value Cov in the saturation region of transistor TR, is shown in formula (3-2). Wherein, the capacitance value Cv11 is proportional to the length L and width W of the transistor TR. When the length L and/or the width W is reduced, a lower capacitance value Cv11 may be obtained.

$$Cv11 = \frac{2}{3}WLC_{ox} + WC_{ov} \text{ (saturation)} \quad (3-2)$$

On the other hand, when the capacitors of the reservoir elements 10(1,1)-10(M,3) are physical capacitors, the physical capacitors may be realized by ferroelectric capacitors, electrochemical tunable capacitors or ONO insulate capacitors. The capacitance values are adjusted by changing the component parameters of various types of capacitors as above-mentioned.

On the other hand, the threshold voltage Vt of the transistors TR of the reservoir elements 10(1,1)-10(M,3) of the reservoir array 300b may be the same or different from one another. For example, the threshold voltages Vt of transistors TR in the same vertical column are the same, and the threshold voltages Vt of transistors TR in different vertical columns are different. The threshold voltage Vt of the transistor TR may be adjusted in the following manner. For example, the threshold voltage Vt is adjusted by changing the thickness of the gate oxide of the transistor TR. In another example, the transistor TR is a SONOS flash memory, or has a floating gate, and the threshold voltage Vt of the transistor TR may be adjusted by applying gate voltage.

Figure 9B:
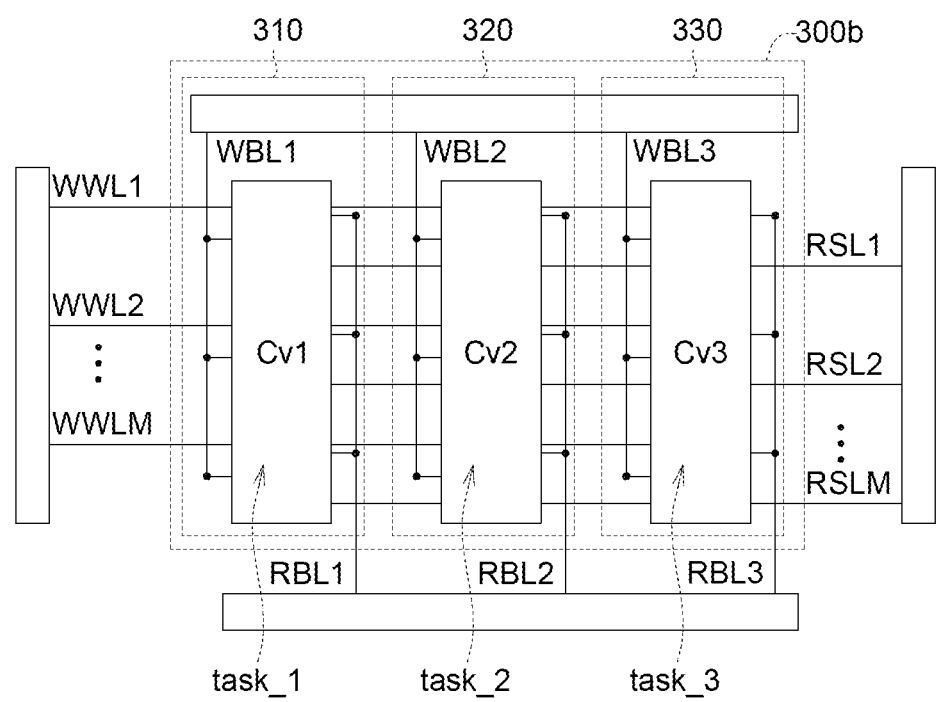
FIG. 9B is a schematic diagram of the operation of the reservoir array 300b of FIG. 9A according to different capacitance values.

FIG. 9B is a schematic diagram of the operation of the reservoir array 300b of FIG. 9A according to different capacitance values. As shown in FIG. 9B, in the reservoir device 310 of the first vertical column, the capacitance value of the capacitor of each reservoir element is equal to the capacitance value Cv1. In the reservoir device 320 of the second vertical column, the capacitance value of the capacitor of each reservoir element is equal to the capacitance value Cv2. In the reservoir device 330 of the third vertical column, the capacitance value of the capacitor of each reservoir element is equal to the capacitance value Cv3. In this embodiment, the capacitors in each vertical column are, for example, physical capacitors, and the number of physical capacitors in each vertical column may be the same. The capacitance values may be adjusted by changing the element parameters of the physical capacitors during the manufacturing process of the reservoir array 300b, so that the capacitance values Cv1, Cv2 and Cv3 of the reservoir devices 310, 320 and 330 in different vertical column are different from each other.

The reservoir devices in different vertical columns may perform different tasks according to different capacitance values Cv1, Cv2 and Cv3. For example, the reservoir device 310 in the first vertical column performs the task task_1 according to the capacitance value Cv1, and the task task_1 is, for example, a reservoir computation for speech recognition. Moreover, the reservoir device 320 in the second vertical column performs the task task_2 according to the capacitance value Cv2, and the task task_2 is, for example, a reservoir computation for image recognition. In addition, the reservoir device 330 in the first vertical column performs the task task_3 according to the capacitance value Cv3, and the task task_3 is, for example, a reservoir computation for stereo image processing.

Figure 9C:
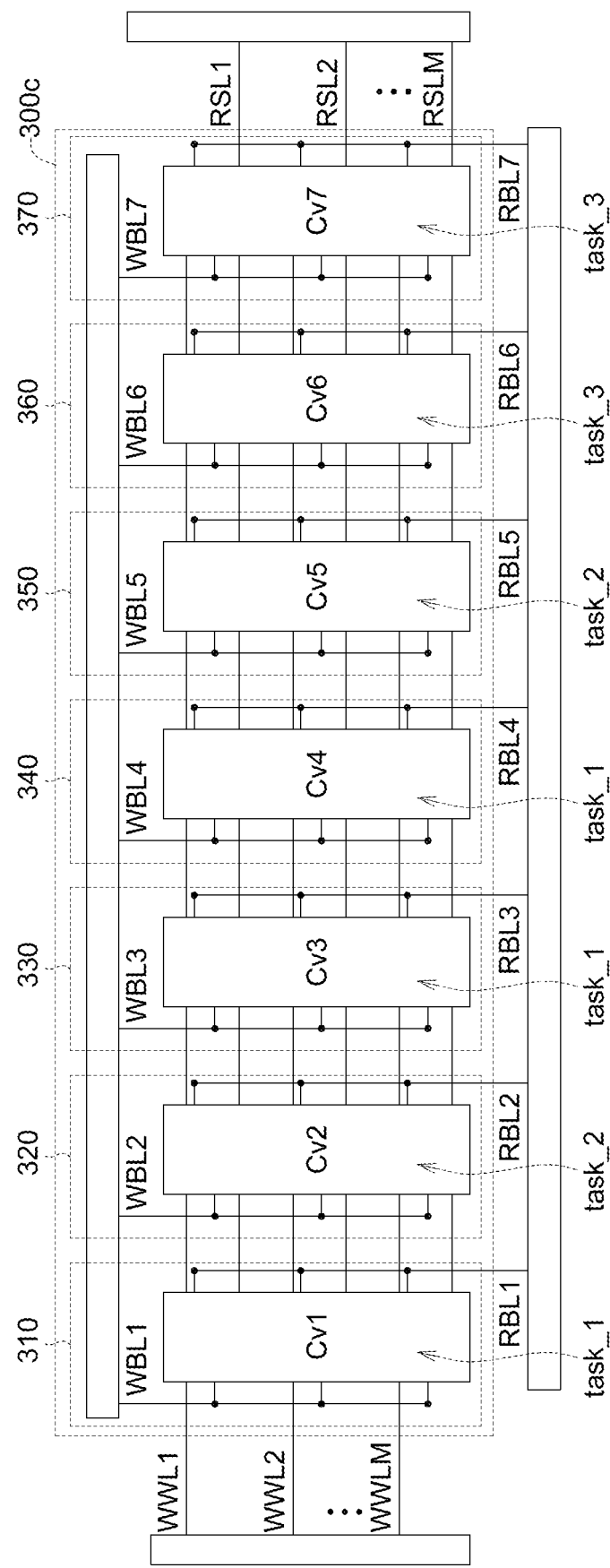
FIG. 9C is a schematic diagram of the operation of the reservoir array 300c of other embodiments of the present disclosure.

FIG. 9C is a schematic diagram of the operation of the reservoir array 300c of other embodiments of the present disclosure. Reservoir array 300c is a variation of reservoir array 300b of FIG. 9B. The capacitance values of the reservoir devices 310-370 in the first to seventh vertical columns of the reservoir array 300c are respectively equal to the capacitance values Cv1-Cv7. The above capacitance values Cv1-Cv7 may be different from each other. In this embodiment, the reservoir devices 310, 330 and 340 in the first, third and fourth vertical columns may perform the task task_1 according to the capacitance values Cv1, Cv3 and Cv4. The reservoir devices 320 and 350 of the second and fifth vertical columns may perform the task task_2 according to the capacitance values Cv2 and Cv5. The reservoir devices 360 and 370 in the sixth and seventh vertical columns may perform the task task_3 according to the capacitance values Cv6 and Cv7.

Figure 9D:
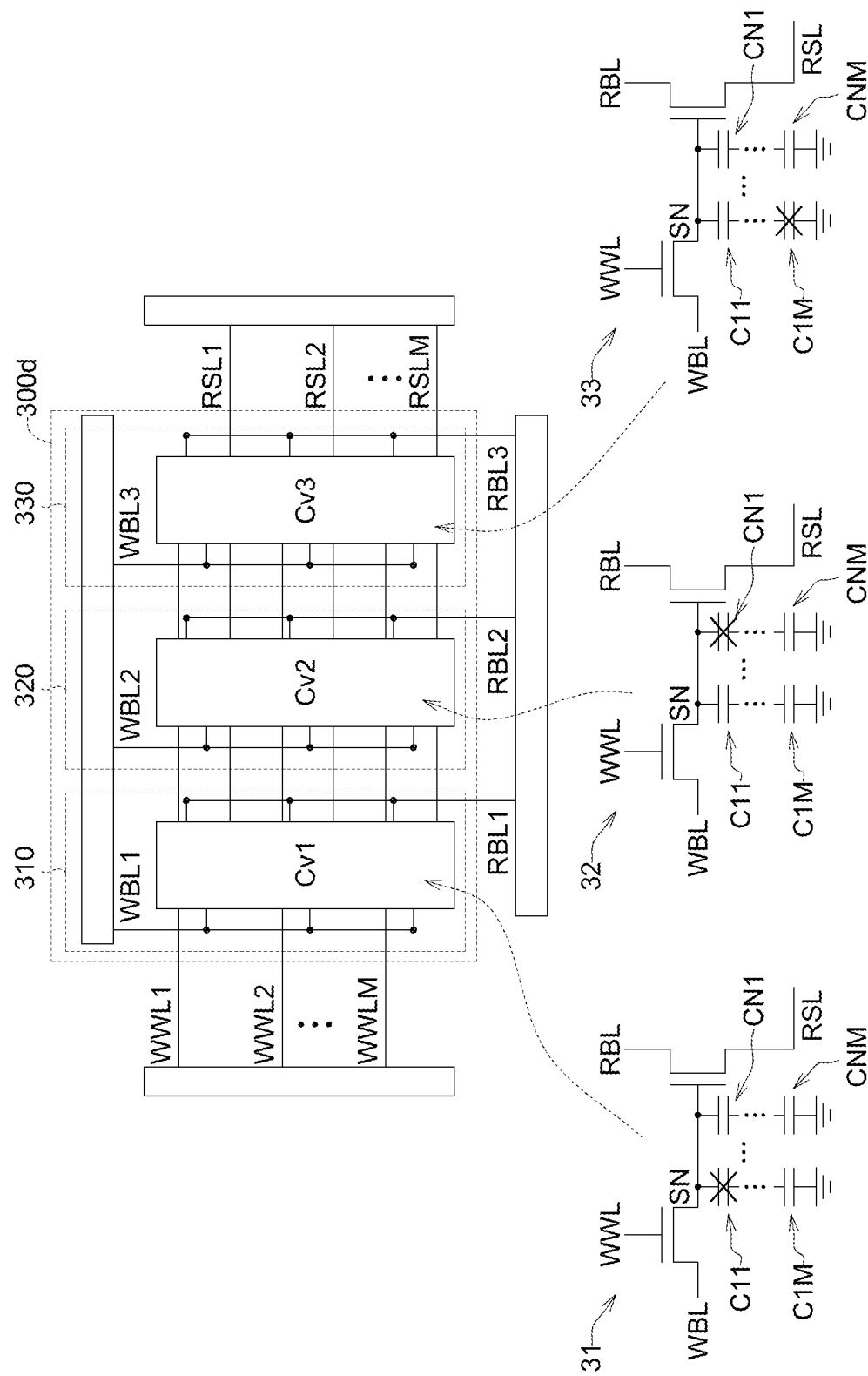
FIG. 9D is a circuit diagram of reservoir array 300d of other embodiments of the present disclosure.

FIG. 9D is a circuit diagram of reservoir array 300d of other embodiments of the present disclosure. The reservoir array 300d of FIG. 9B is another variation of the reservoir array 300b of FIG. 9B. In reservoir devices 310, 320 and 330 of FIG. 9D, capacitive elements of the reservoir elements 31, 32 and 33 have the same layout. The layout of each capacitive element is, for example, N×M capacitors C11-CNM shown in FIG. 5D. The capacitors C11-C1M in the same vertical column are coupled in series, and so on, and the capacitors CN1-CNM in the same vertical column are coupled in series.

Compared with the reservoir array 300b in FIG. 9B in which the capacitance value is adjusted by changing the element parameters of the capacitor so that the capacitance values Cv1, Cv2 and Cv3 of capacitors of reservoir elements in different vertical columns are different from each other, the reservoir array 300d in FIG. 9D obtains different capacitance values by selectively short-circuiting or open-circuiting the capacitors C11-CNM in the layout of the capacitive elements, so that capacitive elements of the reservoir elements 31, 32 and 33 in different vertical columns have capacitance values Cv1, Cv2 and Cv3 different from one another.

For example, in the reservoir element 31 of the reservoir device 310 in the first vertical column, one capacitor C11 in the layout of the capacitive element is open-circuited, so as to change the equivalent capacitance value of the serially-connected capacitors C11-C1M, thereby changing capacitance value Cv1 of the capacitive element of the reservoir element 31. In addition, in the reservoir element 32 of the reservoir device 320 in the second vertical column, the capacitor CN1 in the layout of the capacitive elements is open-circuited, so as to change the capacitance value Cv2 of the capacitive elements of the reservoir elements 32. In the reservoir element 33 of the reservoir device 330 in the third vertical column, the capacitor C1M in the layout of the capacitive element is open-circuited, so to change the capacitance value Cv3 of the capacitive element of the reservoir element 33. Accordingly, the capacitance values Cv1, Cv2 and Cv3 of the capacitive elements of the reservoir elements 31, 32 and 33 in different vertical columns are different from one another.

FIGS. 10A-10H are schematic diagrams of the operation of the reservoir array 300e of other embodiments of the present disclosure. The write operation, read operation and refresh operation of the reservoir array 300e may be independently performed on selected portions of the reservoir elements, selected portions of the vertical columns or selected portions of the horizontal rows, or overall performed on all the reservoir elements. Please refer to FIG. 10A firstly, the write operation of the reservoir array 300e may be performed on a portion of the reservoir elements. For example, the reservoir array 300e selects the first vertical column and the first horizontal row, and the reservoir element 10(1,1) disposed at the position of the first vertical column and the first horizontal row is selected to perform write operation. In the reservoir elements of the first vertical column, the selected reservoir element 10(1,1) of the first horizontal row may perform a write operation independently from the reservoir element of the second horizontal row.

The input voltages of the write bit line WBLi and the read bit line RBLi of each vertical column of the reservoir array 300e, and the input voltages of the write word line WWLi and the read source line RSLi of each horizontal row are shown in Table 2-1.

TABLE 2-1

| | V_WWL | V_WBL | V_RSL | V_RBL |
|---|---|---|---|---|
| Selected reservoir elements | Vw/0 | Vb | 0 | 0 |
| Unselected column | | X or 0 | | 0 |
| Unselected row | 0 | | 0 | |

Please refer to Table 2-1, the input voltage V_WBL of the write bit line WBL1 of the selected first vertical column is equal to the voltage value Vb, and the input voltage V_WWL of the write word line WWL1 the selected first horizontal row is equal to the voltage value Vw or 0V. In addition, the input voltage V_RBL of the read bit line RBL1 in the first vertical column is equal to 0V, and the input voltage V_RSL of the read source line RSL1 in the first horizontal row is equal to 0V.

On the other hand, the input voltage V_WBL of the write bit line WBL2 of the unselected second vertical column is equal to 0V, or the write bit line WBL2 is floating (i.e., the input voltage V_WBL is expressed as "X"), the input voltage V_RBL of the read bit line RBL2 of the second vertical column is equal to 0V. Furthermore, the input voltage V_WWL of the write word line WWL2 of the unselected second horizontal row is equal to 0V, and the input voltage V_RSL of the read source line RSL2 of the second horizontal row is equal to 0V.

Figure 10A:
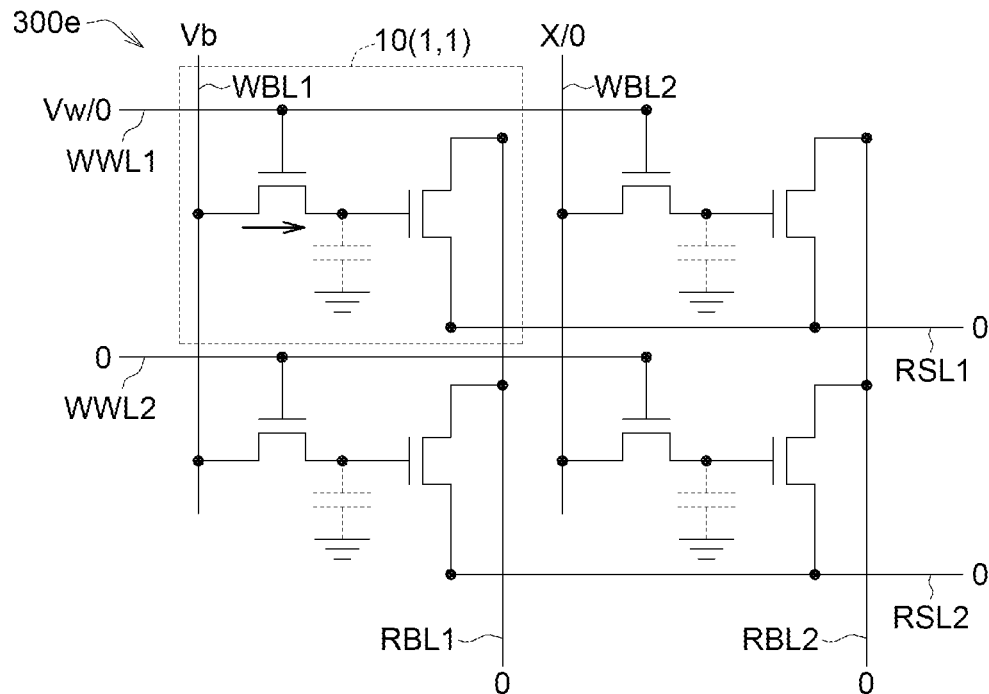
FIGS. 10A-10H are schematic diagrams of the operation of the reservoir array 300e of other embodiments of the present disclosure.
Figure 10B:
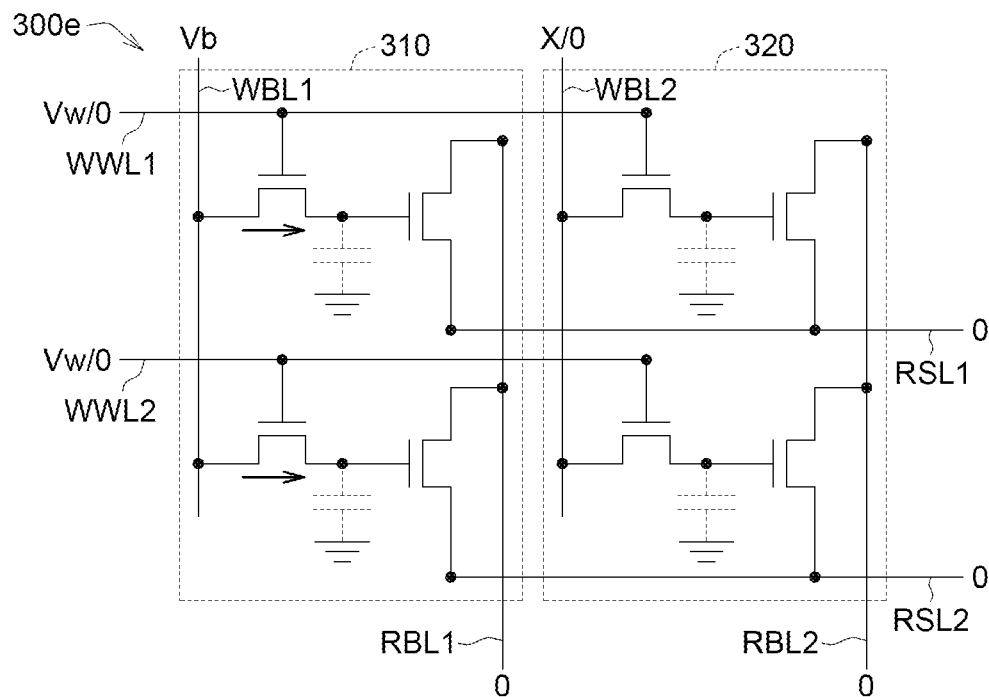

Next, referring to FIG. 10B, the write operation of the reservoir array 300e may be performed for a portion of the vertical columns. For example, the reservoir array 300e selects the first vertical column and the first and second horizontal rows, and all the reservoir elements disposed in the first vertical column are selected to perform a write operation. The reservoir elements of the first vertical column may perform a write operation independently from the reservoir elements of the second vertical column.

The input voltages of the write bit line WBLi and the read bit line RBLi of each vertical column of the reservoir array 300e, and the input voltages of the write word line WWLi and the read source line RSLi of each horizontal row are shown in Table 2-2.

TABLE 2-2

|  | V_WWL | V_WBL | V_RSL | V_RBL |
| --- | --- | --- | --- | --- |
| selected column and row | Vw/0 | Vb | 0 | 0 |
| Unselected column |  | X or 0 |  | 0 |

Please refer to Table 2-2, the input voltage V_WBL of the written bit line WBL1 of the selected first vertical column is equal to the voltage value Vb, and the respective input voltage V_WWL of the write word lines WWL1 and WWL2 the of the selected first and second horizontal rows is equal to the voltage value Vw or 0V. In addition, the input voltage V_RBL of the read bit line RBL1 in the first vertical column is equal to 0V, and the input voltage V_RSL of the read source lines RSL1 and RSL2 in the first and second horizontal rows are equal to 0V.

On the other hand, the input voltage V_WBL of the write bit line WBL2 of the unselected second vertical column is equal to 0V, or the write bit line WBL2 is floating (i.e., the input voltage V_WBL is represented as "X"), and the input voltage V_RBL of the read bit line RBL2 of the second vertical column is equal to 0V.

Figure 10C:
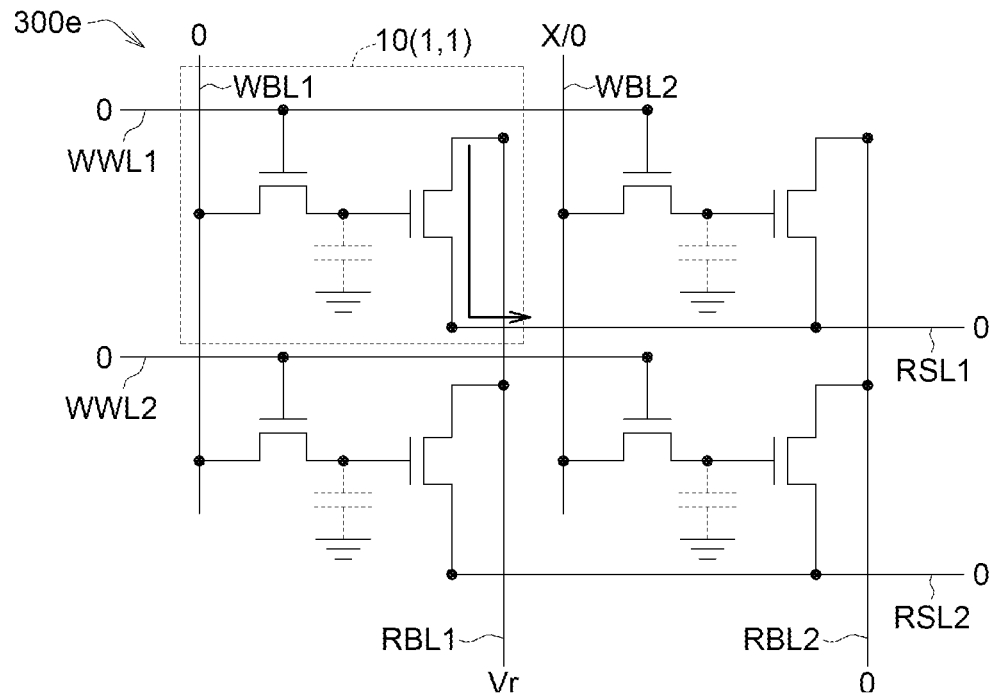

Next, referring to FIG. 10C and Table 3-1, the read operation of the reservoir array 300e may be performed for a portion of the reservoir elements. For example, the reservoir array 300e selects the first vertical column and the first horizontal row, so as to select the reservoir element 10(1,1) to perform the read operation. In the reservoir elements of the first vertical column, the selected reservoir element 10(1,1) of the first horizontal row may perform a read operation independently from the reservoir element of the second horizontal row.

TABLE 3-1

|  | V_WWL | V_WBL | V_RSL | V_RBL |
| --- | --- | --- | --- | --- |
| Selected column | 0 | 0 | 0 | Vr |
| Unselected column |  | X or 0 |  | 0 |

The input voltage V_WBL of the write bit line WBL1 of the selected first vertical column is equal to 0V, and the input voltage V_RBL of the read bit line RBL1 is equal to the voltage value Vr. The input voltage V_WWL of the write word line WWL1 of the selected first horizontal row is equal to 0V, and the input voltage V_RSL of the read source line RSL1 is equal to 0V.

On the other hand, the input voltage V_WBL of the write bit line WBL2 of the unselected second vertical column is equal to 0V, or the write bit line WBL2 is floating (i.e., the input voltage V_WBL is expressed as "X"), and the input voltage V_RBL of the read bit line RBL2 is equal to 0V.

The second horizontal row is not selected, the input voltage V_WWL of the write word line WWL2 of the second horizontal row is equal to 0V, and the input voltage V_RSL of the read source line RSL2 is equal to 0V.

Figure 10D:
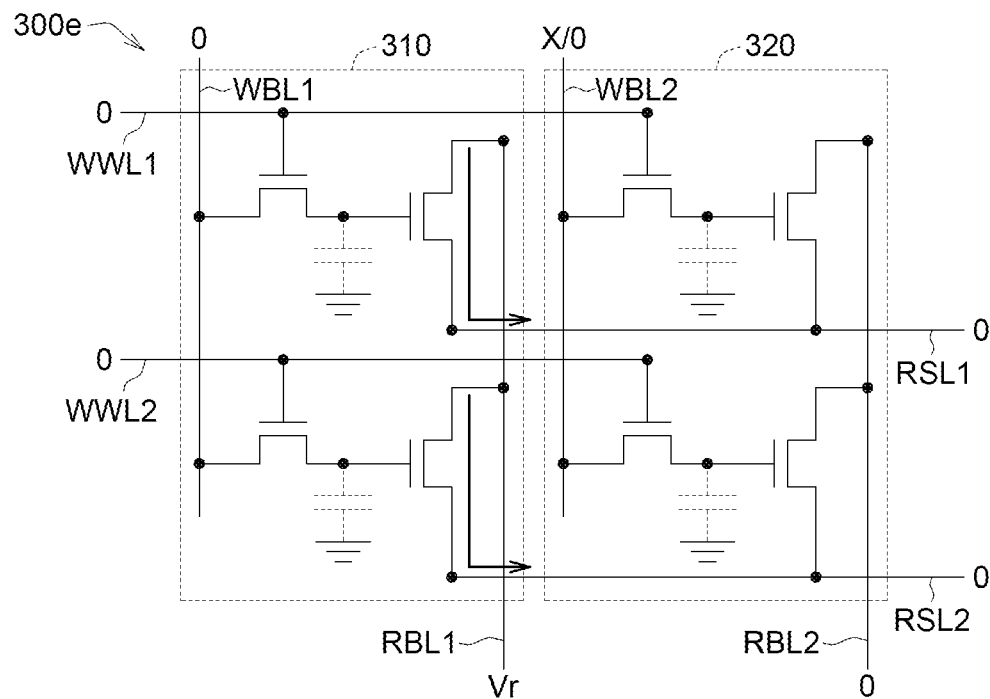

Next, referring to FIG. 10D, the reservoir array 300e selects the first vertical column and the first and second horizontal rows, and all the reservoir elements arranged in the first vertical column are selected to perform the read operation. The reservoir elements of the first vertical column may perform a read operation independently from the reservoir elements of the second vertical column.

The input voltages of each write bit line WBLi and each read bit line RBLi, and the input voltages of each write word line WWLi and each read source line RSLi are also shown in Table 3-1. The second horizontal row is selected, the input voltage V_WWL of the write word line WWL2 of the second horizontal row is equal to 0V, and the input voltage V_RSL of the read source line RSL2 is equal to 0V.

Figure 10E:
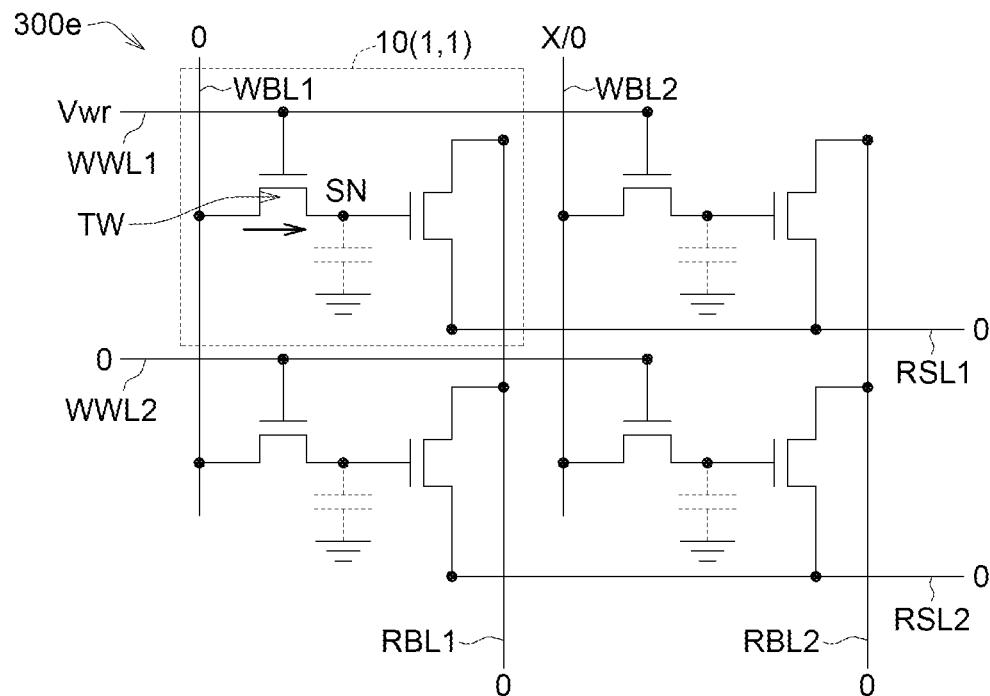

Next, please refer to FIG. 10E and Table 4-1, the refresh operation of the reservoir array 300e may be performed for a portion of the reservoir elements. For example, the reservoir array 300e selects the first vertical column and the first horizontal row, and accordingly selects the reservoir element 10(1,1) to perform the refresh operation. In the reservoir elements of the first vertical column, the selected reservoir element 10(1,1) of the first horizontal row may perform a refresh operation independently from the reservoir element of the second horizontal row.

TABLE 4-1

|  | V_WWL | V_WBL | V_RSL | V_RBL |
| --- | --- | --- | --- | --- |
| Selected reservoir elements | Vwr | 0 | 0 | 0 |
| Unselected column |  | X or 0 |  | 0 |
| Unselected row | 0 |  | 0 |  |

The input voltage V_WWL of the write word line WWL1 of the selected first vertical column is equal to the voltage value Vwr, so that the transistor TW of the reservoir element 10(1,1) is turned ON. The voltage value Vwr may be the same as or different from the voltage value Vw of the writing operation. The input voltage V_WBL of the write bit line WBL1 of the selected first vertical column is equal to 0V, so that the capacitance of the reservoir element 10(1,1) is discharged through the turned-on transistor TW, and the voltage V_SN of the storage node SN is relaxed back to the second potential, the storage node SN is refreshed as a logic value "0".

On the other hand, the input voltage V_RBL of the read bit line RBL1 of the first vertical column is equal to 0V, and the input voltage V_RSL of the read source line RSL1 of the first horizontal row is equal to 0V. The input voltage V_WBL of the write bit line WBL2 of the unselected second vertical column is equal to 0V or the write bit line WBL2 is floating, and the input voltage V_RBL of the read bit line RBL2 is equal to 0V. Moreover, the input voltage V_WWL of the write word line WWL2 of the unselected second horizontal row is equal to 0V, and the input voltage V_RSL of the read source line RSL2 is equal to 0V.

Figure 10F:
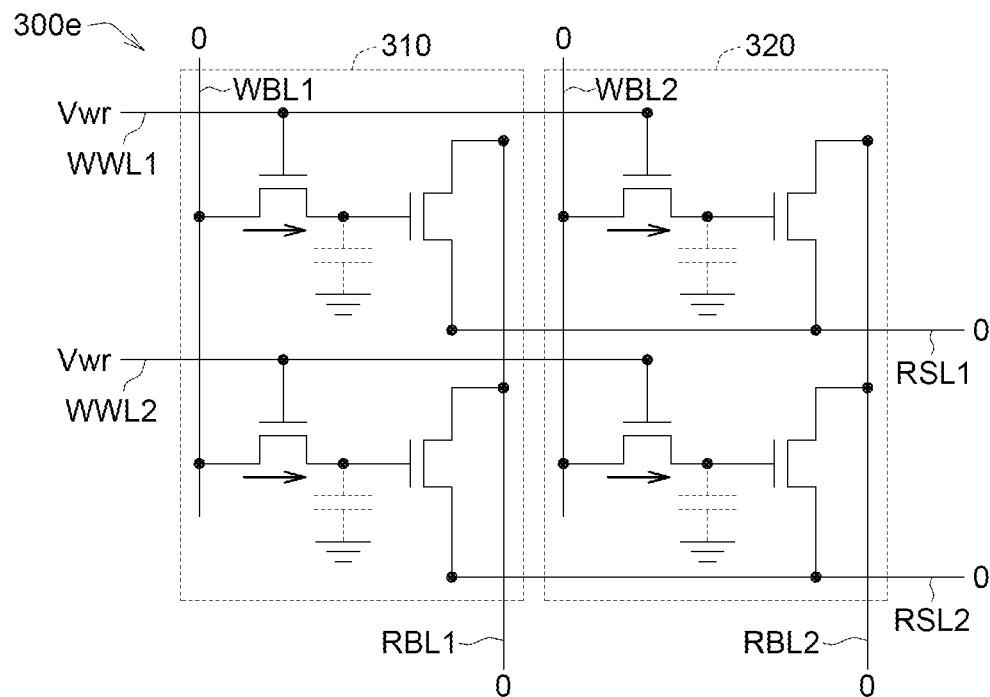

Next, referring to FIG. 10F and Table 4-2, the refresh operation of the reservoir array 300e may be performed for all the reservoir elements in each vertical column and horizontal row.

TABLE 4-2

|  | V_WWL | V_WBL | V_RSL | V_RBL |
| --- | --- | --- | --- | --- |
| All reservoir elements | Vwr | 0 | 0 | 0 |

The input voltage V_WWL of the write word lines WWL1 and WWL2 of the first and second horizontal rows is equal to the voltage value Vwr (i.e., the voltage value Vwr may be the same as or different from the voltage value Vw of the write operation), so that the transistors TW of all the reservoir elements of the reservoir device 310 in the first vertical column and the reservoir device 320 in the second vertical column. Moreover, the input voltage V_WBL of the write bit lines WBL1 and WBL2 of the first and second vertical columns is equal to 0V, so that the capacitors of all the reservoir elements of the reservoir device 310 and the reservoir device 320 are discharged through the turned-on transistor TW, so as to refresh the storage nodes SN of all the reservoir elements as a logic value "0".

Moreover, the input voltage V_RBL of the read bit lines RBL1 and RBL2 of the first and second vertical columns is equal to 0V. The input voltage V_RSL of the read source lines RSL1 and RSL2 of the first and second horizontal rows is equal to 0V.

Figure 10G:
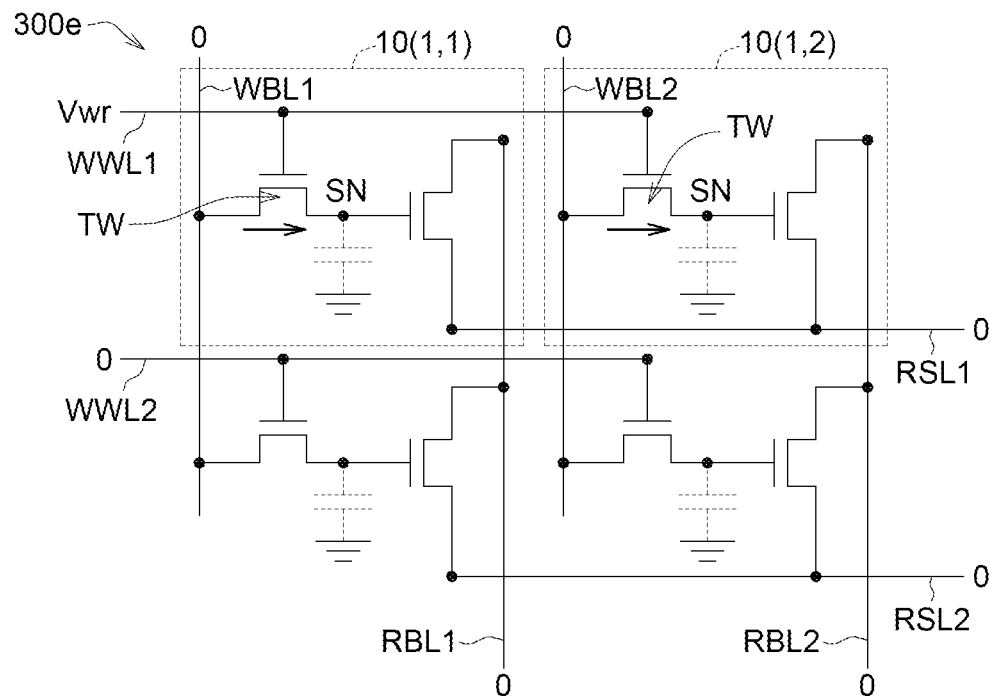

Next, referring to FIG. 10G and Table 5-1, the refresh operation of the reservoir array 300e may be performed for a portion of horizontal rows. For example, the reservoir array 300e selects the reservoir elements 10(1,1) and 10(1,2) in the first horizontal row to perform the refresh operation.

TABLE 5-1

|  | V_WWL | V_WBL | V_RSL | V_RBL |
| --- | --- | --- | --- | --- |
| selected row | Vwr | 0 | 0 | 0 |
| Unselected row | 0 |  | 0 |  |

The input voltage V_WWL of the write word line WWL1 of the selected first horizontal row is equal to the voltage value Vwr (i.e., the voltage value Vwr may be the same as or different from the voltage value Vw of the write operation), so that the transistors TW of the reservoir elements 10(1,1) and 10(1,2) of the first horizontal row are turned ON. Moreover, the input voltage V_WBL of the write bit lines WBL1 and WBL2 of the first and second vertical columns is equal to 0V, so that the capacitors of the reservoir elements 10(1,1) and 10(1,2) are discharged through the turned-on transistors TW to refresh the storage node SN as logic value "0".

On the other hand, the input voltage V_RSL of the read source line RSL1 of the selected first horizontal row is equal to 0V, and the input voltage V_RBL of the read bit line RBL1 is equal to 0V. In contrast, the input voltages of the read source line RSL2 and the write word line WWL2 of the unselected second horizontal row are both equal to 0V.

Figure 10H:
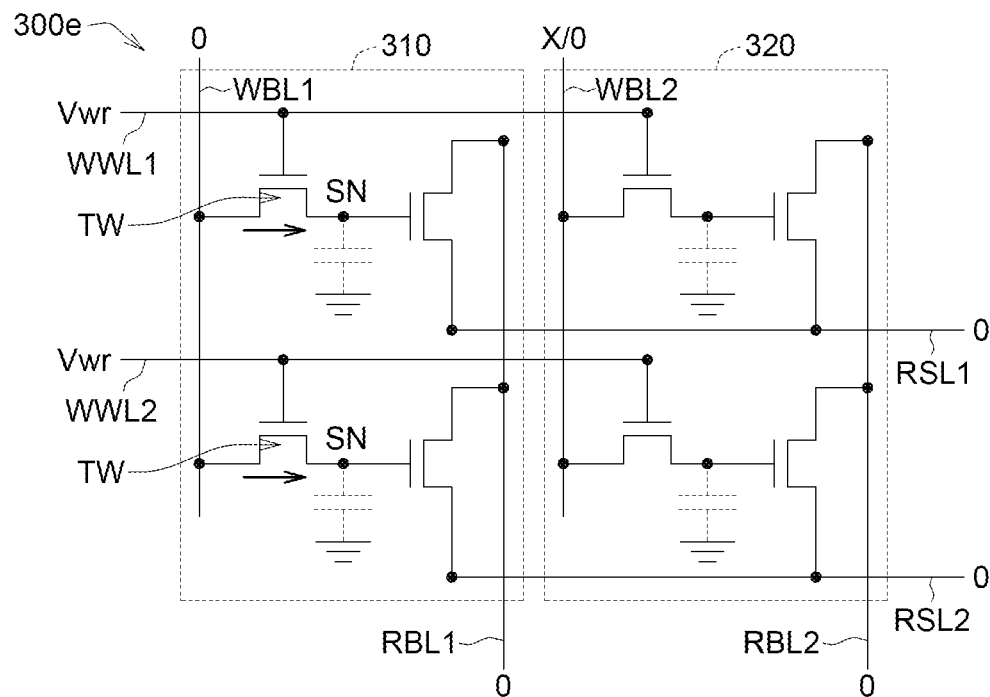

Next, referring to FIG. 10H and Table 5-2, the refresh operation of the reservoir array 300e may be performed for a portion of vertical columns. For example, the reservoir array 300e selects the reservoir device 310 in the first vertical column to perform the refresh operation. The reservoir elements of the first vertical column may perform a refresh operation independently from the reservoir elements of the second vertical column.

TABLE 5-2

|  | V_WWL | V_WBL | V_RSL | V_RBL |
| --- | --- | --- | --- | --- |
| selected column and row | Vwr | 0 | 0 | 0 |
| Unselected column |  | X or 0 |  | 0 |

The reservoir array 300e selects the first vertical column and the first and second horizontal rows. The input voltage V_WWL of the write word lines WWL1 and WWL2 of the first and second horizontal rows is equal to the voltage value Vwr (i.e., the voltage value Vwr may be the same as or different from the voltage value Vw of the write operation). The input voltage V_WBL of the write bit line WBL1 is equal to 0V, so that the capacitor of all the reservoir elements of the reservoir device 310 is discharged through the turned-on transistor TW to refresh the storage node SN as a logic value "0". The input voltage V_RSL of the read source lines RSL1 and RSL2 of the first and second horizontal rows is equal to 0V. The input voltage V_RBL of the read bit lines RBL1 and RBL2 of the first and second vertical columns is equal to 0V.

On the other hand, the input voltage V_WBL of the write bit line WBL2 of the reservoir device 320 of the unselected second vertical column is equal to 0V, or the write bit line WBL2 is floating.

Figure 11:
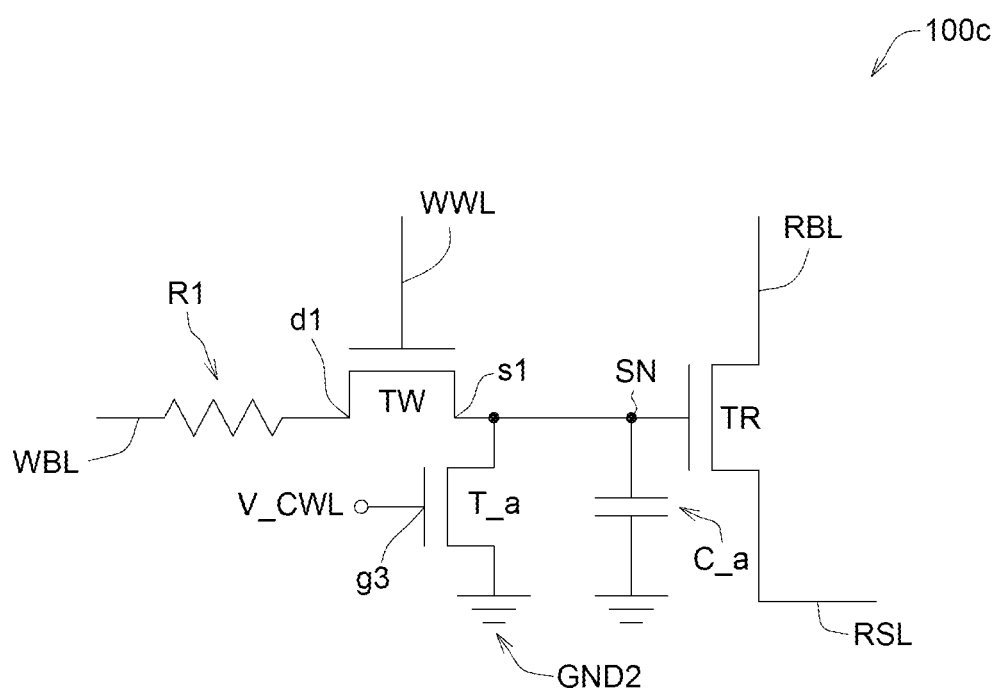
FIG. 11 is a circuit diagram of the reservoir device 100c according to still another embodiment of the present disclosure.

FIG. 11 is a circuit diagram of the reservoir device 100c according to still another embodiment of the present disclosure. The reservoir device 100c of this embodiment is similar to the reservoir device 100a in FIG. 1, the difference is that the reservoir device 100c further includes a resistor R1 and a transistor T_a.

The resistor R1 is disposed between the drain d1 of the transistor TW and the write bit line WBL. The resistor R1 is used to adjust the charging rate of capacitor C_a. When the resistor R1 has a high resistance value, the capacitor C_a may have a low charging rate. That is, the resistor R1 is used to adjust the charging rate of the storage node SN, and when the resistor R1 has a high resistance value, the voltage value V_SN of the storage node SN increases at a lower rate.

The transistor T_a is disposed between the source s1 of the transistor TW and the ground node GND2, and the gate g3 of the transistor T_a receives the input voltage V_CWL. The transistor T_a is used to adjust the discharging rate of the storage node SN. When the input voltage V_CWL has a high voltage value, the storage node SN has a high discharging rate, and the voltage value V_SN of the storage node SN decreases at a higher rate.

To sum up, the reservoir devices based on the 2T0C or 2TXC architectures of various embodiments of the present disclosure may be applied to an in-memory computing (IMC) or a spiking neural network which requires gradual programing and gradual leaking. The reservoir device of the present disclosure may also be used as an integrate-and-fire circuit suitable for spiking neuromorphic applications. Furthermore, the reservoir devices based on the 2T0C or 2TXC architectures may be easily integrated into memory devices, hence the reservoir devices are suitable for executing in-memory computing.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A reservoir device, comprising:
   a first transistor, a gate of the first transistor is coupled to a write word line, a drain of the first transistor is coupled to a write bit line; and
   a second transistor, a source of the second transistor is coupled to a read source line, a drain of the second transistor is coupled to a read bit line, a gate of the second transistor is coupled to a source of the first transistor; and
   a storage node, located on a coupling point between the gate of the second transistor and the source of the first transistor, wherein the storage node is coupled to a capacitive element having a layout comprising a plurality of capacitors, and the capacitance value of the capacitive element is related to selectively short-circuiting or open-circuiting of the capacitors,
   wherein, the reservoir device selectively performs a write operation, a read operation or a refresh operation in response to an input voltage received by the write word line, the write bit line, the read source line and the read bit line respectively; and
   when the reservoir device performs the write operation or the refresh operation, a voltage of the storage node changes, and when the reservoir device performs the read operation, the second transistor generates a read current, and the read current is related to the voltage of the storage node.

2. The reservoir device according to claim 1, wherein the read source line is coupled to a sensing circuit, and the read current is provided to the sensing circuit through the read source line.

3. The reservoir device according to claim 1, wherein when the reservoir device performs the write operation:
   the input voltage received by the write word line is equal to a first voltage value or 0V;
   the input voltage received by the write bit line is equal to a second voltage value;
   the input voltage received by the read source line is equal to 0V; and
   the input voltage received by the read bit line is equal to 0V.

4. The reservoir device according to claim 1, wherein when the reservoir device performs the refresh operation:
   the input voltage received by the write word line is equal to a first voltage value;
   the input voltage received by the write bit line is equal to 0V;
   the input voltage received by the read source line is equal to 0V; and
   the input voltage received by the read bit line is equal to 0V.

5. The reservoir device according to claim 1, wherein when the reservoir device performs the read operation:
   the input voltage received by the write word line is equal to 0V;
   the input voltage received by the write bit line is equal to 0V;
   the input voltage received by the read source line is equal to 0V; and
   the input voltage received by the read bit line is equal to a third voltage value.

6. The reservoir device according to claim 1, wherein after the reservoir device performs at least one time of the write operation, the reservoir device performs one time of the read operation.

7. The reservoir device according to claim 1, wherein the input voltage received by the write word line is an analog form, a multi-level form or a digital form.

8. The reservoir device according to claim 7, wherein when the input voltage is the analog form, a modulation scheme of the input voltage is an amplitude modulation or a pulse width modulation.

9. The reservoir device according to claim 1, wherein the first transistor is an N-type metal oxide semiconductor (NMOS) transistor or a P-type metal oxide semiconductor (PMOS) transistor, and the second transistor is an NMOS transistor.

10. The reservoir device according to claim 1, wherein the storage node is coupled to at least one physical capacitor, and the at least one physical capacitor is a ferroelectric capacitor, an electrochemical tunable capacitor, or an ONO insulate capacitor.

11. The reservoir device according to claim 1, wherein the storage node is coupled to a plurality of physical capacitors, and the physical capacitors are coupled to one another in parallel and/or in series.

12. The reservoir device according to claim 1, wherein a parasitic capacitor exists between the storage node and a ground node, and the equivalent capacitance value of the parasitic capacitor is related to a doping concentration of a P-N junction of the first transistor or a size of the second transistor.

13. The reservoir device according to claim 1, further comprising:
   a third transistor, coupled to the storage node; and
   a resistor, coupled to the drain of the first transistor and the write bit line.

14. A reservoir array, having a plurality of horizontal rows and a plurality of vertical columns, the reservoir array comprising:
   a plurality of reservoir elements, each of the reservoir elements is the reservoir device of claim 1, the reservoir elements are respectively disposed in the horizontal rows and the vertical columns, and the horizontal rows comprise at least a first horizontal row and a second horizontal row, the vertical columns comprise at least a first vertical column and a second vertical column, wherein the reservoir elements disposed in the first vertical column each has a first capacitive element having a first capacitance value, and the reservoir elements disposed in the second vertical column each has a second capacitive element having a second capacitive value not equal to the first capacitive value;
   wherein, the first transistors of the reservoir elements disposed in the first horizontal row are jointly coupled to a first write word line, and the second transistors of the reservoir elements are jointly coupled to a first read source line;
   the first transistors of the reservoir elements disposed in the second horizontal row are jointly coupled to a second write word line, and the second transistors of the reservoir elements are jointly coupled to a second read source line;
   the first transistors of the reservoir elements disposed in the first vertical column are jointly coupled to a first write bit line, and the second transistors of the reservoir elements are jointly coupled to a first read bit line;

the first transistors of the reservoir elements disposed in the second vertical column are jointly coupled to a second write bit line, and the second transistors of the reservoir elements are jointly coupled to a second read bit line; and in response to an input voltage received by the first write word line, the first write bit line, the first read source line, the first read bit line, the second write word line, the second write bit line, the second read source line and the second read bit line respectively, the reservoir elements selectively perform a write operation, a read operation or a refresh operation.

15. The reservoir array according to claim 14, wherein the first write word line and the second write word line are coupled to a first decoding circuit, the first read source line and the second read source line are coupled to a second decoding circuit, the first write bit line and the second write bit line are coupled to a third decoding circuit, the first read bit line and the second read bit line are coupled to a fourth decoding circuit, wherein, the second decoding circuit comprises a read source line decoder and a plurality of sensing amplifiers, and the read current of each of the second transistors is provided to a corresponding one of the sensing amplifiers.

16. The reservoir array according to claim 14, wherein the reservoir elements of the first vertical column perform a reservoir computation of a first task according to the first capacitance value, and the reservoir elements of the second vertical column perform a reservoir computation of a second task according to the second capacitance value, and the first task is different from the second task.

17. The reservoir array according to claim 14, wherein the reservoir elements of the first vertical column perform the write operation, the read operation or the refresh operation independently from the reservoir elements of the second vertical column.

18. The reservoir array according to claim 17, wherein among the reservoir elements of the first vertical column, the reservoir element of the first horizontal row performs the write operation, the read operation or the refresh operation independently from the reservoir element of the second horizontal row.

19. The reservoir array according to claim 14, wherein the reservoir elements of the first vertical column and the reservoir elements in the second vertical column perform the refresh operation concurrently.

* * * * *